United States Patent
Oxford et al.

(10) Patent No.: US 7,903,137 B2
(45) Date of Patent: Mar. 8, 2011

(54) VIDEOCONFERENCING ECHO CANCELLERS

(75) Inventors: William V. Oxford, Austin, TX (US); Michael L. Kenoyer, Austin, TX (US)

(73) Assignee: LifeSize Communications, Inc., Austin, TX (US)

( * ) Notice: Subject to any disclaimer, the term of this patent is extended or adjusted under 35 U.S.C. 154(b) by 1360 days.

(21) Appl. No.: 11/405,684

(22) Filed: Apr. 17, 2006

(65) Prior Publication Data

US 2006/0239443 A1    Oct. 26, 2006

Related U.S. Application Data

(63) Continuation-in-part of application No. 11/251,086, filed on Oct. 14, 2005.

(60) Provisional application No. 60/619,212, filed on Oct. 15, 2004, provisional application No. 60/676,048, filed on Apr. 29, 2005.

(51) Int. Cl.
H04N 7/14    (2006.01)

(52) U.S. Cl. .................... 348/14.01; 379/406.08

(58) Field of Classification Search ............. 379/202.01, 379/406.01; 348/14.01–14.16; 381/92, 122
See application file for complete search history.

(56) References Cited

U.S. PATENT DOCUMENTS

| | | | |
|---|---|---|---|
| 3,963,868 | A | 6/1976 | Randmere et al. |
| 4,903,247 | A | 2/1990 | Van Gerwen et al. |
| 5,029,162 | A | 7/1991 | Epps |
| 5,034,947 | A | 7/1991 | Epps |
| 5,051,799 | A | 9/1991 | Paul et al. |
| 5,054,021 | A | 10/1991 | Epps |
| 5,121,426 | A | 6/1992 | Baumhauer, Jr. et al. |
| 5,168,525 | A | 12/1992 | Muller |
| 5,263,019 | A | 11/1993 | Chu |

(Continued)

FOREIGN PATENT DOCUMENTS

JP         62203432         9/1987

(Continued)

OTHER PUBLICATIONS

Gay, Steven Leslie; "Fast projection algorithms with application to voice echo cancellation"; Doctoral Dissertation, Rutgers University; Oct. 1994; 131 pages.

(Continued)

*Primary Examiner* — Curtis Kuntz
*Assistant Examiner* — Maria El-Zoobi
(74) *Attorney, Agent, or Firm* — Meyertons Hood Kivlin Kowert & Goetzel, P.C.; Jeffrey C. Hood; Mark K. Brightwell

(57) ABSTRACT

A system may be configured to: receive remote audio signals and corresponding spatial indicators from remote systems; generate output signals for local speakers based on the remote audio signals and the corresponding spatial indicators; supply a microphone input signal to a first echo canceller in a series of echo cancellers, where each echo canceller of the series corresponds to a position in a set of positions along a one-dimensional locus connecting the speakers; map each of the remote audio signals to a corresponding one of the positions based on the corresponding spatial indicator; for each position of the set of positions, combine any of the remote audio signals that map to that position in order to form a corresponding input signal for the corresponding echo canceller; transmit a resultant signal including at least an output of a last echo canceller of the series to the remote systems.

20 Claims, 23 Drawing Sheets

U.S. PATENT DOCUMENTS

| | | | |
|---|---|---|---|
| 5,305,307 A | 4/1994 | Chu | |
| 5,335,011 A * | 8/1994 | Addeo et al. | 348/14.1 |
| 5,365,583 A | 11/1994 | Huang et al. | |
| 5,390,244 A | 2/1995 | Hinman et al. | |
| 5,396,554 A | 3/1995 | Hirano et al. | |
| 5,550,924 A | 8/1996 | Helf et al. | |
| 5,566,167 A | 10/1996 | Duttweiler | |
| 5,581,620 A | 12/1996 | Brandstein et al. | |
| 5,606,642 A | 2/1997 | Stautner et al. | |
| 5,617,539 A | 4/1997 | Ludwig et al. | |
| 5,649,055 A | 7/1997 | Gupta et al. | |
| 5,657,393 A | 8/1997 | Crow | |
| 5,664,021 A | 9/1997 | Chu et al. | |
| 5,689,641 A | 11/1997 | Ludwig et al. | |
| 5,715,319 A | 2/1998 | Chu | |
| 5,737,431 A | 4/1998 | Brandstein et al. | |
| 5,751,338 A | 5/1998 | Ludwig, Jr. | |
| 5,778,082 A | 7/1998 | Chu et al. | |
| 5,787,183 A | 7/1998 | Chu et al. | |
| 5,828,756 A * | 10/1998 | Benesty et al. | 379/406.08 |
| 5,844,994 A | 12/1998 | Graumann | |
| 5,896,461 A | 4/1999 | Faraci et al. | |
| 5,924,064 A | 7/1999 | Helf | |
| 5,983,192 A | 11/1999 | Botzko et al. | |
| 6,072,522 A | 6/2000 | Ippolito et al. | |
| 6,130,949 A | 10/2000 | Aoki et al. | |
| 6,141,597 A | 10/2000 | Botzko et al. | |
| 6,173,059 B1 | 1/2001 | Huang et al. | |
| 6,243,129 B1 | 6/2001 | Deierling | |
| 6,246,345 B1 | 6/2001 | Davidson et al. | |
| 6,246,760 B1 * | 6/2001 | Makino et al. | 379/406.08 |
| 6,351,238 B1 | 2/2002 | Kishigami et al. | |
| 6,351,731 B1 | 2/2002 | Anderson et al. | |
| 6,363,338 B1 | 3/2002 | Ubale et al. | |
| 6,453,285 B1 | 9/2002 | Anderson et al. | |
| 6,459,942 B1 | 10/2002 | Markow et al. | |
| 6,535,604 B1 | 3/2003 | Provencal et al. | |
| 6,535,610 B1 | 3/2003 | Stewart | |
| 6,566,960 B1 | 5/2003 | Carver | |
| 6,587,823 B1 | 7/2003 | Kang et al. | |
| 6,590,604 B1 | 7/2003 | Tucker et al. | |
| 6,593,956 B1 | 7/2003 | Potts et al. | |
| 6,594,688 B2 | 7/2003 | Ludwig et al. | |
| 6,615,236 B2 | 9/2003 | Donovan et al. | |
| 6,625,271 B1 | 9/2003 | O'Malley et al. | |
| 6,646,997 B1 | 11/2003 | Baxley et al. | |
| 6,657,975 B1 | 12/2003 | Baxley et al. | |
| 6,697,476 B1 | 2/2004 | O'Malley et al. | |
| 6,721,411 B2 | 4/2004 | O'Malley et al. | |
| 6,731,334 B1 | 5/2004 | Maeng et al. | |
| 6,744,887 B1 | 6/2004 | Berstein et al. | |
| 6,760,415 B2 | 7/2004 | Beecroft | |
| 6,816,904 B1 | 11/2004 | Ludwig et al. | |
| 6,822,507 B2 | 11/2004 | Buchele | |
| 6,831,675 B2 | 12/2004 | Shachar et al. | |
| 6,850,265 B1 | 2/2005 | Strubbe et al. | |
| 6,856,689 B2 | 2/2005 | Sudo et al. | |
| 6,912,178 B2 | 6/2005 | Chu et al. | |
| 6,931,123 B1 * | 8/2005 | Hughes | 379/406.01 |
| 6,980,485 B2 | 12/2005 | McCaskill | |
| 7,012,630 B2 * | 3/2006 | Curry et al. | 348/14.08 |
| 7,130,428 B2 | 10/2006 | Hirai et al. | |
| 7,133,062 B2 | 11/2006 | Castles et al. | |
| 7,245,710 B1 * | 7/2007 | Hughes | 379/202.01 |
| 7,660,425 B1 * | 2/2010 | Reed et al. | 379/406.01 |
| 2002/0123895 A1 | 9/2002 | Potekhin et al. | |
| 2003/0197316 A1 | 10/2003 | Baumhauer, Jr. et al. | |
| 2004/0001137 A1 | 1/2004 | Cutler et al. | |
| 2004/0010549 A1 | 1/2004 | Matus et al. | |
| 2004/0032487 A1 | 2/2004 | Chu et al. | |
| 2004/0032796 A1 | 2/2004 | Chu et al. | |
| 2004/0183897 A1 | 9/2004 | Kenoyer et al. | |
| 2005/0157866 A1 | 7/2005 | Marton et al. | |
| 2005/0169459 A1 | 8/2005 | Marton et al. | |
| 2005/0212908 A1 | 9/2005 | Rodman et al. | |
| 2005/0262201 A1 | 11/2005 | Rudolph et al. | |
| 2006/0013416 A1 | 1/2006 | Truong et al. | |
| 2006/0034469 A1 | 2/2006 | Tamiya et al. | |
| 2006/0109998 A1 | 5/2006 | Michel | |
| 2006/0165242 A1 | 7/2006 | Miki et al. | |

FOREIGN PATENT DOCUMENTS

| | | |
|---|---|---|
| JP | 07264102 | 3/1994 |
| JP | 07135478 | 5/1995 |
| JP | 07240722 | 9/1995 |
| JP | 09307651 | 11/1997 |
| JP | 10190848 | 7/1998 |
| WO | 9922460 | 5/1999 |
| WO | 2005064908 | 7/2005 |

OTHER PUBLICATIONS

Silverman, et al.; "A two-stage algorithm for determining talker location from linear microphone array data"; Computer Speech and Language; vol. 6, No. 2; 1992; 24 pages.

"A history of video conferencing (VC) technology" http://web.archive.org/web/20030622161425/http://myhome.hanafos.com/~soonjp/vchx.html (web archive dated Jun. 22, 2003); 5 pages.

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Young Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; http://www.video.ja.net/intro/; 2001; 26 pages.

"Polycom Executive Collection"; Jun. 2003; 4 pages; Polycom, Inc.; Pleasanton, CA.

Joe Duran and Charlie Sauer; "Mainstream Videoconferencing—A Developer's Guide to Distance Multimedia"; Jan. 1997; pp. 179-186; Addison Wesley Longman, Inc.

Buchner, et al., "Simultaneous Localization of Multiple Sound Sources Using Blind Adaptive MIMO Filtering", IEEE International Conference on Acoustics, Speech, and Signal Processing 2005, Mar. 18-23, 2005, vol. 3, pp. iii/97-iii100.

Kammeyer, et al., "New Aspects of Combining Echo Cancellers with Beamformers", IEEE International Conference on Acoustics, Speech, and Signal Processing 2005, Mar. 18-23, 2005, vol. 3, pp. iii/137-iii/140.

Moussas, et al., "Adaptive On-Line Multiple Source Detection", IEEE International Conference on Acoustics, Speech, and Signal Processing 2005, Mar. 18-23, 2005, vol. 4, pp. iv/1029-iv/1032.

PCT/US97/17770, Apr. 16, 1998, PICTURETEL Corp.

"MacSpeech Certifies Voice Tracker™ Array Microphone"; Apr. 20, 2005; 2 pages; MacSpeech Press.

"The Wainhouse Research Bulletin"; Apr. 12, 2006; 6 pages; vol. 7, #14.

"VCON Videoconferencing"; http://web.archive.org/web/20041012125813/http://www.itc.virginia.edu/netsys/videoconf/midlevel.html; 2004; 6 pages.

M. Berger and F. Grenez; "Performance Comparison of Adaptive Algorithms for Acoustic Echo Cancellation"; European Signal Processing Conference, Signal Processing V: Theories and Applications, 1990; pp. 2003-2006.

C.L. Dolph; "A current distribution for broadside arrays which optimizes the relationship between beam width and side-lobe level". Proceedings of the I.R.E. and Wave and Electrons; Jun. 1946; pp. 335-348; vol. 34.

M. Mohan Sondhi, Dennis R. Morgan and Joseph L. Hall; "Stereophonic Acoustic Echo Cancellation—An Overview of the Fundamental Problem"; IEEE Signal Processing Letters; Aug. 1995; pp. 148-151; vol. 2, No. 8.

Rudi Frenzel and Marcus E. Hennecke; "Using Prewhitening and Stepsize Control to Improve the Performance of the LMS Algorithm for Acoustic Echo Compensation"; IEEE International Symposium on Circuits and Systems; 1992; pp. 1930-1932.

Steven L. Gay and Richard J. Mammone; "Fast converging subband acoustic echo cancellation using RAP on the WE DSP16A"; International Conference on Acoustics, Speech, and Signal Processing; Apr. 1990; pp. 1141-1144.

Andre Gilloire and Martin Vetterli; "Adaptive Filtering in Subbands with Critical Sampling: Analysis, Experiments, and Application to Acoustic Echo Cancellation"; IEEE Transactions on Signal Processing, Aug. 1992; pp. 1862-1875; vol. 40, No. 8.

Andre Gilloire; "Experiments with Sub-band Acoustic Echo Cancellers for Teleconferencing"; IEEE International Conference on Acoustics, Speech, and Signal Processing; Apr. 1987; pp. 2141-2144; vol. 12.

Henry Cox, Robert M. Zeskind and Theo Kooij; "Practical Supergain", IEEE Transactions on Acoustics, Speech, and Signal Processing; Jun. 1986; pp. 393-398.

Walter Kellermann; "Analysis and design of multirate systems for cancellation of acoustical echoes"; International Conference on Acoustics, Speech, and Signal Processing, 1988 pp. 2570-2573; vol. 5.

Lloyd Griffiths and Charles W. Jim; "An Alternative Approach to Linearly Constrained Adaptive Beamforming"; IEEE Transactions on Antennas and Propagation; Jan. 1982; pp. 27-34; vol. AP-30, No. 1.

B. K. Lau and Y. H. Leung; "A Dolph-Chebyshev Approach to the Synthesis of Array Patterns for Uniform Circular Arrays" International Symposium on Circuits and Systems; May 2000; 124-127; vol. 1.

C. M. Tan, P. Fletcher, M. A. Beach, A. R. Nix, M. Landmann and R. S. Thoma; "On the Application of Circular Arrays in Direction Finding Part I: Investigation into the estimation algorithms", 1st Annual COST 273 Workshop, May/Jun. 2002; 8 pages.

Ivan Tashev; Microsoft Array project in MSR: approach and results, http://research.microsoft.com/users/ivantash/Documents/MicArraysInMSR.pdf; Jun. 2004; 49 pages.

Hiroshi Yasukawa, Isao Furukawa and Yasuzou Ishiyama; "Accoustic Echo Control for High Quality Audio Teleconferencing"; International Conference on Acoustics, Speech, and Signal Processing; May 1989; pp. 2041-2044; vol. 3.

Hiroshi Yasukawa and Shoji Shimada; "An Acoustic Echo Canceller Using Subband Sampling and Decorrelation Methods"; IEEE Transactions on Signal Processing; Feb. 1993; pp. 926-930; vol. 41, Issue 2.

"Press Releases"; Retrieved from the Internet: http://www.acousticmagic.com/press/; Mar. 14, 2003-Jun. 12, 2006; 18 pages; Acoustic Magic.

Marc Gayer, Markus Lohwasser and Manfred Lutzky; "Implementing MPEG Advanced Audio Coding and Layer-3 encoders on 32-bit and 16-bit fixed-point processors"; Jun. 25, 2004; 7 pages; Revision 1.11; Fraunhofer Institute for Integrated Circuits IIS; Erlangen, Germany.

Man Mohan Sondhi and Dennis R. Morgan; "Acoustic Echo Cancellation for Stereophonic Teleconferencing"; May 9, 1991; 2 pages; AT&T Bell Laboratories, Murray Hill, NJ.

* cited by examiner

VIDEOCONFERENCING ECHO CANCELLERS

PRIORITY CLAIMS

This application is a continuation-in-part of U.S. patent application Ser. No. 11/251,086, filed on Oct. 14, 2005, entitled "Speakerphone Supporting Video and Audio Features", invented by Michael L. Kenoyer, Craig B. Malloy and Wayne E. Mock, which claims the benefit of:

U.S. Provisional Application 60/619,212, entitled "Video Conferencing Speakerphone" which was filed Oct. 15, 2004, whose inventors are Michael L. Kenoyer, Craig B. Malloy, and Wayne E. Mock; and U.S. provisional patent application Ser. No. 60/676,048, entitled "Speakerphone Supporting Video and Audio Features" which was filed Apr. 29, 2005, whose inventor is Wayne E. Mock.

BACKGROUND OF THE INVENTION

1. Field of the Invention

The present invention relates generally to the field of communication devices and, more specifically, to speakerphones and video conferencing systems.

2. Description of the Related Art

A videoconferencing system may include a microphone and a plurality of speakers. The videoconferencing system may receive a remote audio signal from a remote system and transmits the remote audio signal from the plurality of speakers. Thus, the remote audio signal radiates into space so that local persons can hear the voices of other persons situated around the remote system. Unfortunately, this transmission of the remote audio signal (from the speakers) and the reflections of this transmission are picked up by the microphone. Thus, the signal received from the microphone includes a combination of (a) the voice signals generated by local participants and (b) the multi-path interference due to the remote audio signal transmission. Thus, a videoconferencing system may perform echo cancellation in order to remove (b) from the microphone input signal, leaving a cleaner representation of (a). However, the echo cancellation task is made more difficult because the remote audio signal may be transmitted from different speakers at different times, or, different combinations of the speakers at different times. Thus, there exists a need for more robust echo cancellation systems and methodologies capable of handling such situations.

SUMMARY

In one set of embodiments, a method for performing echo cancellation may include:
(a) receiving one or more remote audio signals and corresponding spatial indicators from one or more remote systems;
(b) generating output signals for a plurality of speakers based on the one or more remote audio signals and the corresponding spatial indicators;
(c) supplying a microphone input signal to a first echo canceller in a series of echo cancellers, wherein each echo canceller of the series corresponds to a position in a set of positions along a one-dimensional locus connecting the plurality of speakers;
(d) mapping each of the remote audio signals to a corresponding one of the positions based on the corresponding spatial indicator;
(e) for each position of the set of positions, combining any of the remote audio signals that map to that position in order to form a corresponding input signal for the corresponding echo canceller; and
(f) transmitting a resultant signal including at least an output of a last echo canceller of the series to the one or more remote systems.

The action of generating output signals for a plurality of speakers may include determining a set of gain coefficients for each remote audio signal based on the corresponding spatial indicator, where each gain coefficient of the set of gain coefficients controls an extent to which the remote audio signal contributes to a corresponding one of the speaker output signals.

The actions (a) through (f) may be performed by one or more processors in a device such as a videoconferencing system or a speakerphone.

The method may also include: receiving one or more remote video signals from the one or more remote systems; generating a local video signal from the one or more remote video signals; and displaying the local video signal on a display unit.

The action of combining any of the remote audio signals that map to that position in order to form a corresponding input signal may involve setting the corresponding input signal equal to zero in the case that there are currently no remote audio signals that map to that position.

The method may also include repeating (a) through (f), e.g., on an ongoing basis throughout the course of a conversation.

In another set of embodiments, a method for performing echo cancellation may include:

In one set of embodiments, a method for performing echo cancellation, using a series of echo cancellers, in response to receiving one or more remote audio signals and corresponding spatial indicators from one or more remote system, the method including:
(a) generating output signals for a plurality of speakers based on the one or more remote audio signals and the corresponding spatial indicators;
(b) mapping each of the remote audio signals to a corresponding position in a set of positions based on the corresponding spatial indicator, wherein the set of positions lie on a one-dimensional locus passing through the speakers;
(c) for each position of the set of positions, combining any of the remote audio signals that map to that position in order to form an input signal for a corresponding one of the echo cancellers in the series; and
(d) transmitting a resultant signal including at least an output of a last echo canceller of the series to the one or more remote systems.

Any of the various method embodiments disclosed herein (or any combinations thereof or portions thereof) may be implemented in terms of program instructions. The program instructions may be stored in (or on) any of various memory media. A memory medium is a medium configured for the storage of information. Examples of memory media include various kinds of magnetic media (e.g., magnetic tape or magnetic disk); various kinds of optical media (e.g., CD-ROM); various kinds of semiconductor RAM and ROM; various media based on the storage of electrical charge or other physical quantities; etc.

Furthermore, various embodiments of a system including a memory and a processor are contemplated, where the memory is configured to store program instructions and the processor is configured to read and execute the program instructions from the memory. In various embodiments, the program instructions encode corresponding ones of the method embodiments described herein (or combinations thereof or portions thereof). For example, in one embodiment, the program instructions are executable to implement:

(a) receiving one or more remote audio signals and corresponding spatial indicators from one or more remote systems;

(b) generating output signals for a plurality of speakers based on the one or more remote audio signals and the corresponding spatial indicators;

(c) supplying a microphone input signal to a first echo canceller in a series of echo cancellers, wherein each echo canceller of the series corresponds to a position in a set of positions along a one-dimensional locus connecting the plurality of speakers;

(d) mapping each of the remote audio signals to a corresponding one of the positions based on the corresponding spatial indicator;

(e) for each position of the set of positions, combining any of the remote audio signals that map to that position in order to form a corresponding input signal for the corresponding echo canceller; and (f) transmitting a resultant signal including at least an output of a last echo canceller of the series to the one or more remote systems.

The system may also include the microphone and the plurality of speakers. For example, embodiments of the system targeted for realization as a speakerphone may include the microphone and the speakers.

In some embodiments, the system may also include a display unit and a video camera.

In one embodiment, (a) through (f) may be performed for each microphone in an array of microphones. A separate series of echo cancellers is maintained for each microphone. Beam forming may be performed on the corrected microphone signals, i.e., the output signal from the last echo canceller of each series.

BRIEF DESCRIPTION OF THE DRAWINGS

The following detailed description makes reference to the accompanying drawings, which are now briefly described.

Figure 1A:
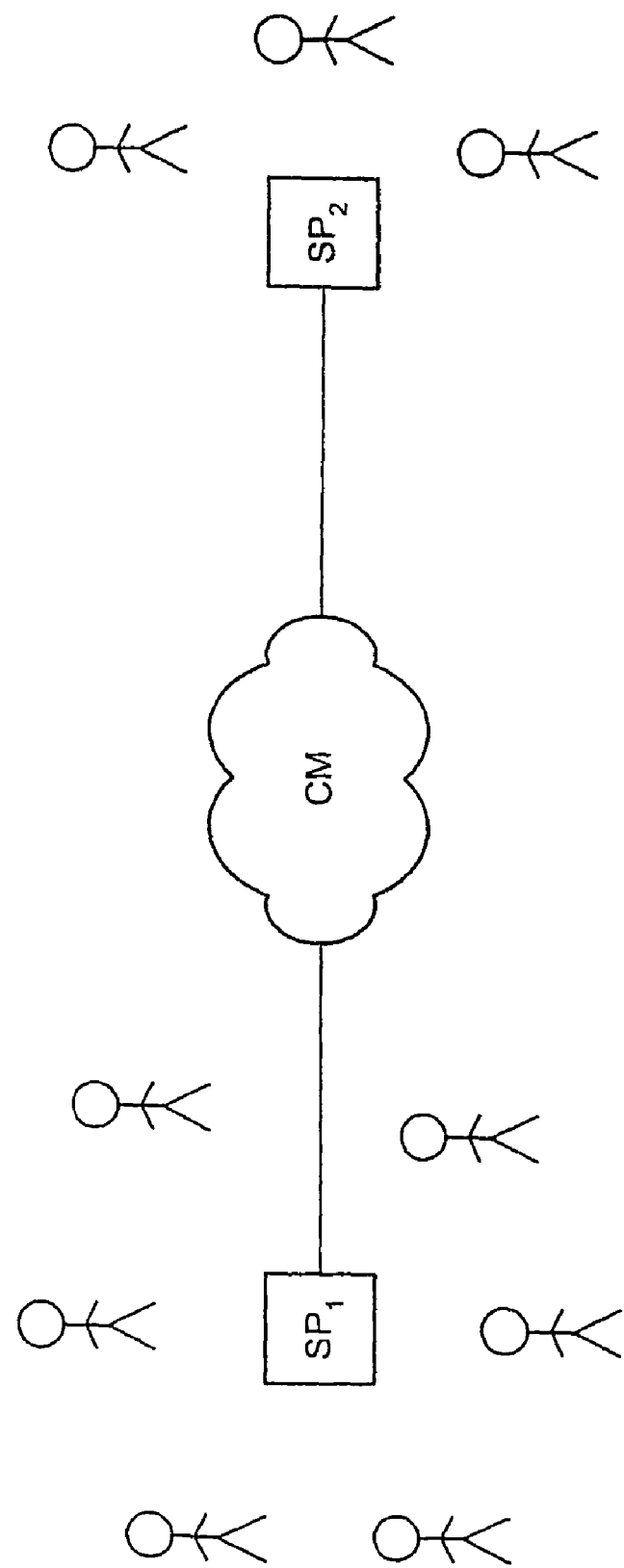
FIG. 1A illustrates communication system including two speakerphones coupled through a communication mechanism.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF THE PREFERRED EMBODIMENTS

U.S. Provisional Application No. 60/676,415, filed on Apr. 29, 2005, entitled "Speakerphone Functionality", invented by William V. Oxford, Vijay Varadarajan and Ioannis S. Dedes, is hereby incorporated by reference in its entirety.

U.S. patent application Ser. No. 11/251,084, filed on Oct. 14, 2005, entitled "Speakerphone", invented by William V. Oxford, is hereby incorporated by reference in its entirety.

U.S. patent application Ser. No. 11/108,341, filed on Apr. 18, 2005, entitled "Speakerphone Self Calibration and Beam Forming", invented by William V. Oxford and Vijay Varadarajan, is hereby incorporated by reference in its entirety.

U.S. Patent Application titled "Videoconferencing System Transcoder", Ser. No. 11/252,238, which was filed Oct. 17, 2005, whose inventors are Michael L. Kenoyer and Michael V. Jenkins, is hereby incorporated by reference in its entirety.

U.S. Patent Application titled "Speakerphone Supporting Video and Audio Features", Ser. No. 11/251,086, which was filed Oct. 14, 2005, whose inventors are Michael L. Kenoyer, Craig B. Malloy and Wayne E. Mock is hereby incorporated by reference in its entirety.

U.S. Patent Application titled "High Definition Camera Pan Tilt Mechanism", Ser. No. 11/251,083, which was filed Oct. 14, 2005, whose inventors are Michael L. Kenoyer, William V. Oxford, Patrick D. Vanderwilt, Hans-Christoph Haenlein, Branko Lukic and Jonathan I. Kaplan, is hereby incorporated by reference in its entirety.

U.S. Provisional Patent Application titled "Video Conferencing Speakerphone", Ser. No. 60/619,212, which was filed Oct. 15, 2004, whose inventors are Michael L. Kenoyer, Craig B. Malloy, and Wayne E. Mock is hereby incorporated by reference in its entirety.

U.S. Provisional Patent Application titled "Video Conference Call System", Ser. No. 60/619,210, which was filed Oct. 15, 2004, whose inventors are Michael J. Burkett, Ashish Goyal, Michael V. Jenkins, Michael L. Kenoyer, Craig B. Malloy, and Jonathan W. Tracey is hereby incorporated by reference in its entirety.

U.S. Provisional Patent Application titled "High Definition Camera and Mount", Ser. No. 60/619,227, which was filed Oct. 15, 2004, whose inventors are Michael L. Kenoyer, Patrick D. Vanderwilt, Paul D. Frey, Paul Leslie Howard, Jonathan I. Kaplan, and Branko Lukic, is hereby incorporated by reference in its entirety.

List of Acronyms Used Herein

| | |
|---|---|
| DDR SDRAM = | Double-Data-Rate Synchronous Dynamic RAM |
| DRAM = | Dynamic RAM |
| FIFO = | First-In First-Out Buffer |
| FIR = | Finite Impulse Response |
| FFT = | Fast Fourier Transform |
| Hz = | Hertz |
| IIR = | Infinite Impulse Response |
| ISDN = | Integrated Services Digital Network |
| kHz = | kiloHertz |
| PSTN = | Public Switched Telephone Network |
| RAM = | Random Access Memory |
| RDRAM = | Rambus Dynamic RAM |
| ROM = | Read Only Memory |
| SDRAM = | Synchronous Dynamic Random Access Memory |
| SRAM = | Static RAM |

A communication system may be configured to facilitate voice communication between participants (or groups of participants) who are physically separated as suggested by FIG. 1A. The communication system may include a first speakerphone SP, and a second speakerphone $SP_2$ coupled through a communication mechanism CM. The communication mechanism CM may be realized by any of a wide variety of well known communication technologies. For example, communication mechanism CM may be the PSTN (public switched telephone network) or a computer network such as the Internet.

Speakerphone Block Diagram

Figure 1B:
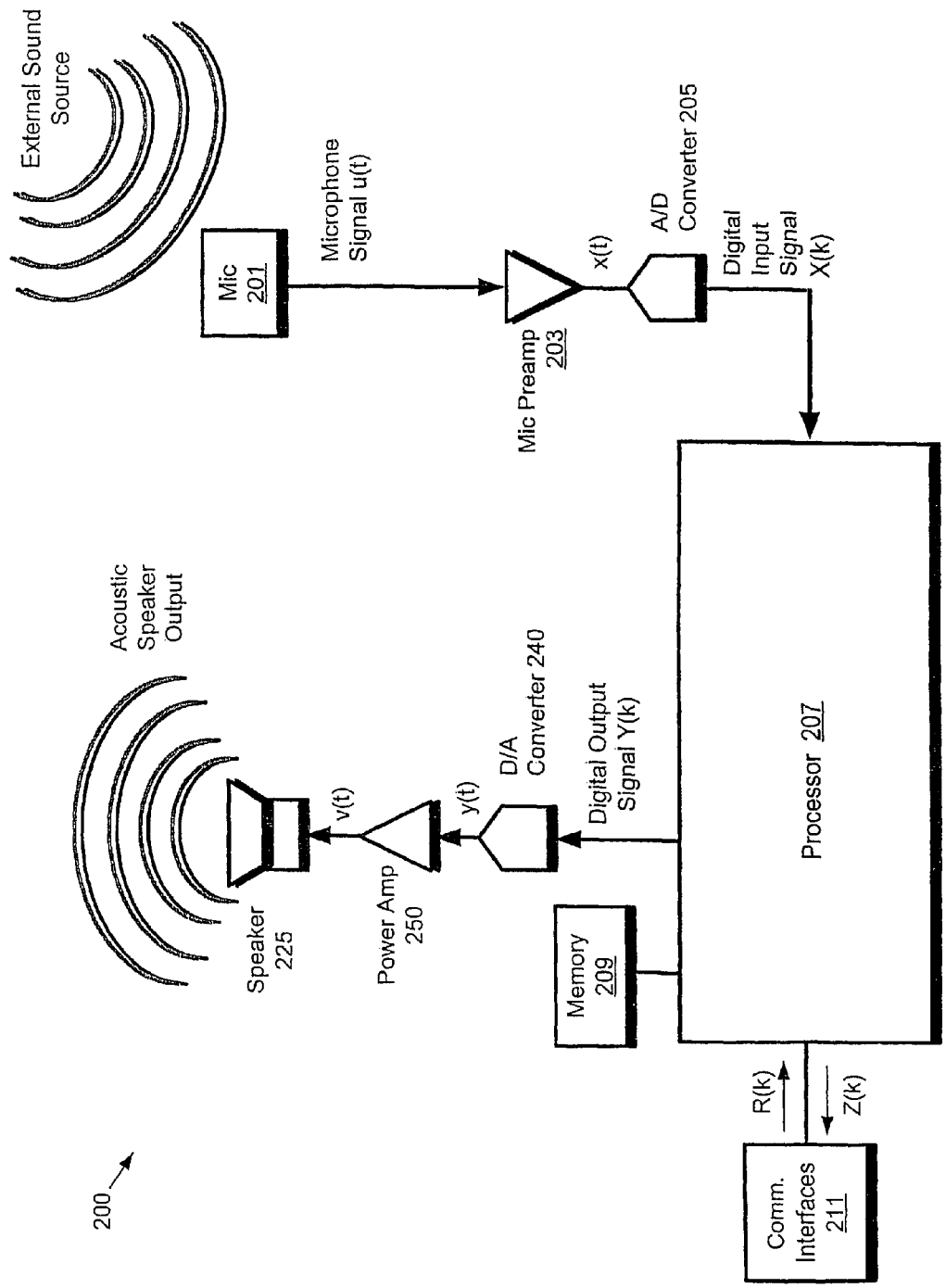
FIG. 1B illustrates one set of embodiments of a speakerphone system 200.

FIG. 1B illustrates a speakerphone 200 according to one set of embodiments. The speakerphone 200 may include a processor 207 (or a set of processors), memory 209, a set 211 of one or more communication interfaces, an input subsystem and an output subsystem.

The processor 207 is configured to read program instructions which have been stored in memory 209 and to execute the program instructions in order to enact any of the various methods described herein.

Memory 209 may include any of various kinds of semiconductor memory or combinations thereof. For example, in one embodiment, memory 209 may include a combination of Flash ROM and DDR SDRAM.

The input subsystem may include a microphone 201 (e.g., an electret microphone), a microphone preamplifier 203 and an analog-to-digital (A/D) converter 205. The microphone 201 receives an acoustic signal A(t) from the environment and converts the acoustic signal into an electrical signal u(t). (The variable t denotes time.) The microphone preamplifier 203 amplifies the electrical signal u(t) to produce an amplified signal x(t). The A/D converter samples the amplified signal x(t) to generate digital input signal X(k). The digital input signal X(k) is provided to processor 207.

In some embodiments, the A/D converter may be configured to sample the amplified signal x(t) at least at the Nyquist rate for speech signals. In other embodiments, the A/D converter may be configured to sample the amplified signal x(t) at least at the Nyquist rate for audio signals.

Processor 207 may operate on the digital input signal X(k) to remove various sources of noise, and thus, generate a corrected microphone signal Z(k). The processor 207 may send the corrected microphone signal Z(k) to one or more remote devices (e.g., a remote speakerphone) through one or more of the set 211 of communication interfaces.

The set 211 of communication interfaces may include a number of interfaces for communicating with other devices (e.g., computers or other speakerphones) through well-known communication media. For example, in various embodiments, the set 211 includes a network interface (e.g., an Ethernet bridge), an ISDN interface, a PSTN interface, or, any combination of these interfaces.

The speakerphone 200 may be configured to communicate with other speakerphones over a network (e.g., an Internet Protocol based network) using the network interface. In one embodiment, the speakerphone 200 is configured so multiple speakerphones, including speakerphone 200, may be coupled together in a daisy chain configuration.

The output subsystem may include a digital-to-analog (D/A) converter 240, a power amplifier 250 and a speaker 225. The processor 207 may provide a digital output signal Y(k) to the D/A converter 240. The D/A converter 240 converts the digital output signal Y(k) to an analog signal y(t). The power amplifier 250 amplifies the analog signal y(t) to generate an amplified signal v(t). The amplified signal v(t) drives the speaker 225. The speaker 225 generates an acoustic output signal in response to the amplified signal v(t).

Processor 207 may receive a remote audio signal R(k) from a remote speakerphone through one of the communication interfaces and mix the remote audio signal R(k) with any locally generated signals (e.g., beeps or tones) in order to generate the digital output signal Y(k). Thus, the acoustic signal radiated by speaker 225 may be a replica of the acoustic signals (e.g., voice signals) produced by remote conference participants situated near the remote speakerphone.

In one alternative embodiment, the speakerphone may include circuitry external to the processor 207 to perform the mixing of the remote audio signal R(k) with any locally generated signals.

In general, the digital input signal X(k) represents a superposition of contributions due to:
- acoustic signals (e.g., voice signals) generated by one or more persons (e.g., conference participants) in the environment of the speakerphone 200, and reflections of these acoustic signals off of acoustically reflective surfaces in the environment;
- acoustic signals generated by one or more noise sources (such as fans and motors, automobile traffic and fluorescent light fixtures) and reflections of these acoustic signals off of acoustically reflective surfaces in the environment; and
- the acoustic signal generated by the speaker 225 and the reflections of this acoustic signal off of acoustically reflective surfaces in the environment.

Processor 207 may be configured to execute software including an acoustic echo cancellation (AEC) module. The AEC module attempts to estimate the sum C(k) of the contributions to the digital input signal X(k) due to the acoustic signal generated by the speaker and a number of its reflections, and, to subtract this sum C(k) from the digital input signal X(k) so that the corrected microphone signal Z(k) may be a higher quality representation of the acoustic signals generated by the local conference participants.

In one set of embodiments, the AEC module may be configured to perform many (or all) of its operations in the frequency domain instead of in the time domain. Thus, the AEC module may:
- estimate the Fourier spectrum $C(\omega)$ of the signal C(k) instead of the signal C(k) itself, and
- subtract the spectrum $C(\omega)$ from the spectrum $X(\omega)$ of the input signal X(k) in order to obtain a spectrum $Z(\omega)$.

An inverse Fourier transform may be performed on the spectrum $Z(\omega)$ to obtain the corrected microphone signal Z(k). As used herein, the "spectrum" of a signal is the Fourier transform (e.g., the FFT) of the signal.

In order to estimate the spectrum $C(\omega)$, the acoustic echo cancellation module may utilize:
- the spectrum $Y(\omega)$ of a set of samples of the output signal Y(k), and
- modeling information $I_M$ describing the input-output behavior of the system elements (or combinations of system elements) between the circuit nodes corresponding to signals Y(k) and X(k).

For example, in one set of embodiments, the modeling information $I_M$ may include:
(a) a gain of the D/A converter 240;
(b) a gain of the power amplifier 250;
(c) an input-output model for the speaker 225;
(d) parameters characterizing a transfer function for the direct path and reflected path transmissions between the output of speaker 225 and the input of microphone 201;
(e) a transfer function of the microphone 201;
(f) a gain of the preamplifier 203;
(g) a gain of the A/D converter 205.

Figure 2:
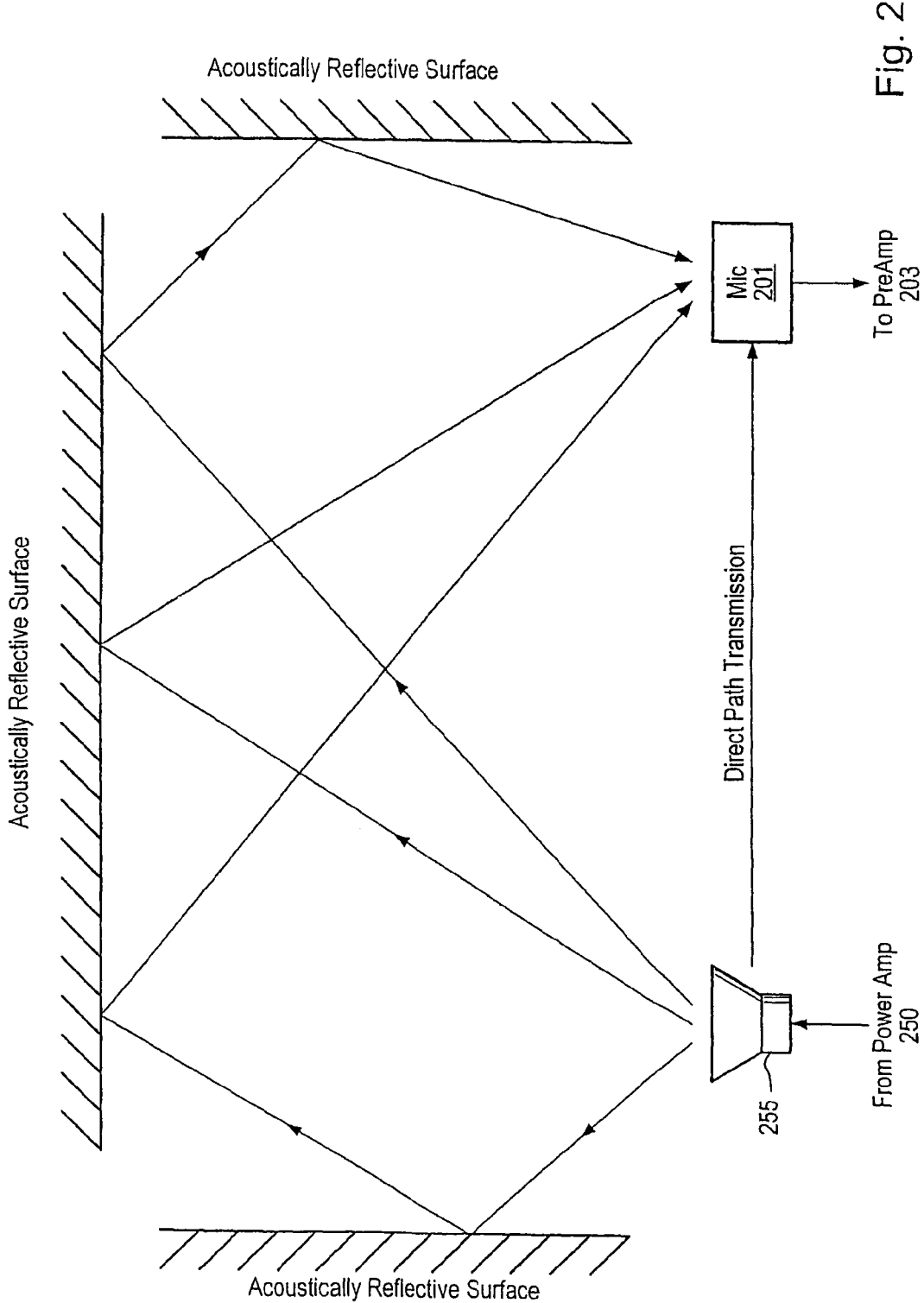
FIG. 2 illustrates a direct path transmission and three examples of reflected path transmissions between the speaker 255 and microphone 201.

The parameters (d) may include attenuation coefficients and propagation delay times for the direct path transmission and a set of the reflected path transmissions between the output of speaker 225 and the input of microphone 201. FIG. 2 illustrates the direct path transmission and three reflected path transmission examples.

In some embodiments, the input-output model for the speaker may be (or may include) a nonlinear Volterra series model, e.g., a Volterra series model of the form:

$$f_S(k) = \sum_{i=0}^{N_a-1} a_i v(k-i) + \sum_{i=0}^{N_b-1} \sum_{j=0}^{M_b-1} b_{ij} v(k-i) \cdot v(k-j), \quad (1)$$

where v(k) represents a discrete-time version of the speaker's input signal, where $f_S(k)$ represents a discrete-time version of the speaker's acoustic output signal, where $N_a$, $N_b$ and $M_b$ are positive integers. For example, in one embodiment, $N_a=8$, $N_b=3$ and $M_b=2$. Expression (1) has the form of a quadratic polynomial. Other embodiments using higher order polynomials are contemplated.

In alternative embodiments, the input-output model for the speaker is a transfer function (or equivalently, an impulse response).

In one embodiment, the AEC module may compute the compensation spectrum $C(\omega)$ using the output spectrum $Y(\omega)$ and the modeling information $I_M$ (including previously estimated values of the parameters (d)). Furthermore, the AEC module may compute an update for the parameters (d) using the output spectrum $Y(\omega)$, the input spectrum $X(\omega)$, and at least a subset of the modeling information $I_M$ (possibly including the previously estimated values of the parameters (d)).

In another embodiment, the AEC module may update the parameters (d) before computing the compensation spectrum $C(\omega)$.

In those embodiments where the speaker input-output model is a nonlinear model (such as a Volterra series model), the AEC module may be able to converge more quickly and/or achieve greater accuracy in its estimation of the attenuation coefficients and delay times (of the direct path and reflected paths) because it will have access to a more accurate representation of the actual acoustic output of the speaker than in those embodiments where a linear model (e.g., a transfer function) is used to model the speaker.

In some embodiments, the AEC module may employ one or more computational algorithms that are well known in the field of echo cancellation.

The modeling information $I_M$ (or certain portions of the modeling information $I_M$) may be initially determined by measurements performed at a testing facility prior to sale or distribution of the speakerphone 200. Furthermore, certain portions of the modeling information $I_M$ (e.g., those portions that are likely to change over time) may be repeatedly updated based on operations performed during the lifetime of the speakerphone 200.

In one embodiment, an update to the modeling information $I_M$ may be based on samples of the input signal X(k) and samples of the output signal Y(k) captured during periods of time when the speakerphone is not being used to conduct a conversation.

In another embodiment, an update to the modeling information $I_M$ may be based on samples of the input signal X(k) and samples of the output signal Y(k) captured while the speakerphone 200 is being used to conduct a conversation.

In yet another embodiment, both kinds of updates to the modeling information $I_M$ may be performed.

Updating Modeling Information Based on Offline Calibration Experiments

In one set of embodiments, the processor 207 may be programmed to update the modeling information $I_M$ during a period of time when the speakerphone 200 is not being used to conduct a conversation.

The processor 207 may wait for a period of relative silence in the acoustic environment. For example, if the average power in the input signal X(k) stays below a certain threshold for a certain minimum amount of time, the processor 207 may reckon that the acoustic environment is sufficiently silent for a calibration experiment. The calibration experiment may be performed as follows.

The processor 207 may output a known noise signal as the digital output signal Y(k). In some embodiments, the noise signal may be a burst of maximum-length-sequence noise, followed by a period of silence. For example, in one embodiment, the noise signal burst may be approximately 2-2.5 seconds long and the following silence period may be approximately 5 seconds long. In some embodiments, the noise signal may be submitted to one or more notch filters (e.g., sharp notch filters), in order to null out one or more frequencies known to causes resonances of structures in the speakerphone, prior to transmission from the speaker.

The processor 207 may capture a block $B_X$ of samples of the digital input signal X(k) in response to the noise signal transmission. The block $B_X$ may be sufficiently large to capture the response to the noise signal and a sufficient number of its reflections for a maximum expected room size. For example, in one embodiment, the block $B_X$ may be sufficiently large to capture the response to the noise signal and a full reverb tail corresponding to the noise signal for a maximum expected room size.

The block $B_X$ of samples may be stored into a temporary buffer, e.g., a buffer which has been allocated in memory 209.

The processor 207 computes a Fast Fourier Transform (FFT) of the captured block $B_X$ of input signal samples X(k) and an FFT of a corresponding block $B_Y$ of samples of the known noise signal Y(k), and computes an overall transfer function $H(\omega)$ for the current experiment according to the relation $$H(\omega) = \text{FFT}(B_X)/\text{FFT}(B_Y), \quad (2)$$

where $\omega$ denotes angular frequency. The processor may make special provisions to avoid division by zero.

The processor 207 may operate on the overall transfer function $H(\omega)$ to obtain a midrange sensitivity value $s_1$ as follows.

The midrange sensitivity value $s_1$ may be determined by computing an A-weighted average of the magnitude of the overall transfer function $H(\omega)$:

$$s_1 = \text{SUM}[|H(\omega)|A(\omega), \omega \text{ ranging from zero to } \pi]. \quad (3)$$

In some embodiments, the weighting function $A(\omega)$ may be designed so as to have low amplitudes:
- at low frequencies where changes in the overall transfer function due to changes in the properties of the speaker are likely to be expressed, and
- at high frequencies where changes in the overall transfer function due to material accumulation on the microphone diaphragm are likely to be expressed.

Figures 3, 4A, 4B, 5:
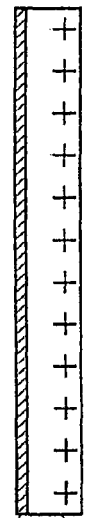
FIG. 3 illustrates a diaphragm of an electret microphone.
FIG. 4A illustrates the change over time of a microphone transfer function.
FIG. 4B illustrates the change over time of the overall transfer function due to changes in the properties of the speaker over time under the assumption of an ideal microphone.
FIG. 5 illustrates a lowpass weighting function $L(\omega)$.

The diaphragm of an electret microphone is made of a flexible and electrically non-conductive material such as plastic (e.g., Mylar) as suggested in FIG. 3. Charge (e.g., positive charge) is deposited on one side of the diaphragm at the time of manufacture. A layer of metal may be deposited on the other side of the diaphragm.

As the microphone ages, the deposited charge slowly dissipates, resulting in a gradual loss of sensitivity over all frequencies. Furthermore, as the microphone ages material such as dust and smoke accumulates on the diaphragm, making it gradually less sensitive at high frequencies. The summation of the two effects implies that the amplitude of the microphone transfer function $|H_{mic}(\omega)|$ decreases at all frequencies, but decreases faster at high frequencies as suggested by FIG. 4A. If the speaker were ideal (i.e., did not change its properties over time), the overall transfer function $H(\omega)$ would manifest the same kind of changes over time.

The speaker 225 includes a cone and a surround coupling the cone to a frame. The surround is made of a flexible material such as butyl rubber. As the surround ages it becomes more compliant, and thus, the speaker makes larger excursions from its quiescent position in response to the same current stimulus. This effect is more pronounced at lower frequencies and negligible at high frequencies. In addition, the longer excursions at low frequencies implies that the vibrational mechanism of the speaker is driven further into the nonlinear regime. Thus, if the microphone were ideal (i.e., did not change its properties over time), the amplitude of the overall transfer function $H(\omega)$ in expression (2) would increase at low frequencies and remain stable at high frequencies, as suggested by FIG. 4B.

The actual change to the overall transfer function $H(\omega)$ over time is due to a combination of affects including the speaker aging mechanism and the microphone aging mechanism just described.

In addition to the sensitivity value $s_1$, the processor 207 may compute a lowpass sensitivity value $s_2$ and a speaker related sensitivity $s_3$ as follows. The lowpass sensitivity factor $s_2$ may be determined by computing a lowpass weighted average of the magnitude of the overall transfer function $H(\omega)$:

$$s_2 = \text{SUM}[|H(\omega)|L(\omega), \omega \text{ ranging from zero to } \pi]. \quad (4)$$

The lowpass weighting function $L(\omega)$ equals is equal (or approximately equal) to one at low frequencies and transitions towards zero in the neighborhood of a cutoff frequency. In one embodiment, the lowpass weighting function may smoothly transition to zero as suggested in FIG. 5.

The processor 207 may compute the speaker-related sensitivity value $s_3$ according to the expression:

$$s_3 = s_2 - s_1.$$

The processor 207 may maintain sensitivity averages $S_1$, $S_2$ and $S_3$ corresponding to the sensitivity values $s_1$, $s_2$ and $s_3$ respectively. The average $S_i$, i=1, 2, 3, represents the average of the sensitivity value $s_i$ from past performances of the calibration experiment.

Furthermore, processor 207 may maintain averages $A_i$ and $B_{ij}$ corresponding respectively to the coefficients $a_i$ and $b_{ij}$ in the Volterra series speaker model. After computing sensitivity value $s_3$, the processor may compute current estimates for the coefficients $b_{ij}$ by performing an iterative search. Any of a wide variety of known search algorithms may be used to perform this iterative search.

In each iteration of the search, the processor may select values for the coefficients $b_{ij}$ and then compute an estimated input signal $X_{EST}(k)$ based on:
- the block $B_Y$ of samples of the transmitted noise signal Y(k);
- the gain of the D/A converter 240 and the gain of the power amplifier 250;

the modified Volterra series expression $$f_S(k) = c \sum_{i=0}^{N_a-1} A_i v(k-i) + \sum_{i=0}^{N_b-1} \sum_{j=0}^{M_b-1} b_{ij} v(k-i) \cdot v(k-j), \quad (5)$$

where c is given by $c = s_3/S_3$;
the parameters characterizing the transfer function for the direct path and reflected path transmissions between the output of speaker 225 and the input of microphone 201;
the transfer function of the microphone 201;
the gain of the preamplifier 203; and
the gain of the A/D converter 205.

The processor may compute the energy of the difference between the estimated input signal $X_{EST}(k)$ and the block $B_X$ of actually received input samples $X(k)$. If the energy value is sufficiently small, the iterative search may terminate. If the energy value is not sufficiently small, the processor may select a new set of values for the coefficients $b_{ij}$, e.g., using knowledge of the energy values computed in the current iteration and one or more previous iterations.

The scaling of the linear terms in the modified Volterra series expression (5) by factor c serves to increase the probability of successful convergence of the $b_{ij}$.

After having obtained final values for the coefficients $b_{ij}$, the processor 207 may update the average values $B_{ij}$ according to the relations:

$$B_{ij} \leftarrow k_{ij} B_{ij} + (1 - k_{ij}) b_{ij}, \quad (6)$$

where the values $k_{ij}$ are positive constants between zero and one.

In one embodiment, the processor 207 may update the averages $A_i$ according to the relations:

$$A_i \leftarrow g_i A_i + (1 - g_i)(cA_i), \quad (7)$$

where the values $g_i$ are positive constants between zero and one.

In an alternative embodiment, the processor may compute current estimates for the Volterra series coefficients $a_i$ based on another iterative search, this time using the Volterra expression:

$$f_S(k) = \sum_{i=0}^{N_a-1} a_i v(k-i) + \sum_{i=0}^{N_b-1} \sum_{j=0}^{M_b-1} B_{ij} v(k-i) \cdot v(k-j). \quad (8A)$$

After having obtained final values for the coefficients $a_i$, the processor may update the averages $A_i$ according the relations:

$$A_i \leftarrow g_i A_i + (1 - g_i) a_i. \quad (8B)$$

The processor may then compute a current estimate $T_{mic}$ of the microphone transfer function based on an iterative search, this time using the Volterra expression:

$$f_S(k) = \sum_{i=0}^{N_a-1} A_i v(k-i) + \sum_{i=0}^{N_b-1} \sum_{j=0}^{M_b-1} B_{ij} v(k-i) \cdot v(k-j). \quad (9)$$

After having obtained a current estimate $T_{mic}$ for the microphone transfer function, the processor may update an average microphone transfer function $H_{mic}$ based on the relation:

$$H_{mic}(\omega) \leftarrow k_m H_{mic}(\omega) + (1 - k_m) T_{mic}(\omega), \quad (10)$$

where $k_m$ is a positive constant between zero and one.

Furthermore, the processor may update the average sensitivity values $S_1$, $S_2$ and $S_3$ based respectively on the currently computed sensitivities $s_1$, $s_2$, $s_3$, according to the relations:

$$S_1 \leftarrow h_1 S_1 + (1 - h_1) s_1; \quad (11)$$

$$S_2 \leftarrow h_2 S_2 + (1 - h_2) s_2, \quad (12)$$

$$S_3 \leftarrow h_3 S_3 + (1 - h_3) s_3, \quad (13)$$

where $h_1$, $h_2$, $h_3$ are positive constants between zero and one.

In the discussion above, the average sensitivity values, the Volterra coefficient averages $A_i$ and $B_{ij}$ and the average microphone transfer function $H_{mic}$ are each updated according to an IIR filtering scheme. However, other filtering schemes are contemplated such as FIR filtering (at the expense of storing more past history data), various kinds of nonlinear filtering, etc.

Figure 6A:
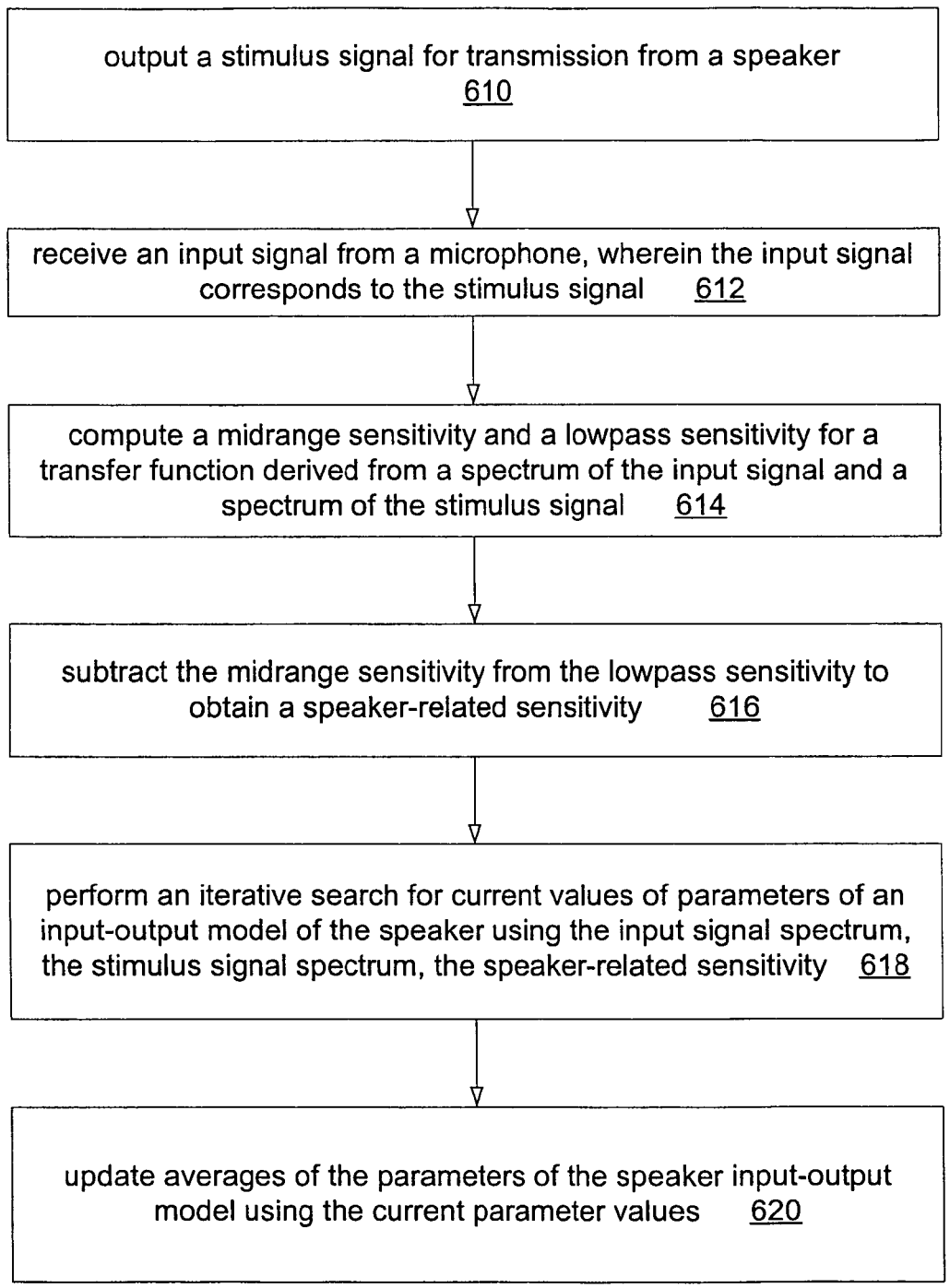
FIG. 6A illustrates one set of embodiments of a method for performing offline self calibration.

In one set of embodiments, a method for calibrating a system including at least a speaker may be performed as illustrated FIG. 6A.

At 610, a stimulus signal may be provided as output for transmission from the speaker. The stimulus signal may be a noise signal, e.g., a burst of maximum length sequence noise.

At 612, an input signal may be received from a microphone, where the input signal corresponds to the stimulus signal. The input signal may capture the response to the stimulus signal and a sufficient number of its reflections for a maximum expected room size.

At 614, a midrange sensitivity and a lowpass sensitivity may be computed for a transfer function $H(\omega)$ derived from a spectrum of the input signal and a spectrum of the stimulus signal.

At 616, the midrange sensitivity may be subtracted from the lowpass sensitivity to obtain a speaker-related sensitivity.

At 618, an iterative search may be performed in order to determine current values of parameters of an input-output model of the speaker using the input signal spectrum, the stimulus signal spectrum, and the speaker-related sensitivity. Any of a wide variety of known search algorithms may be used to perform this iterative search.

At 620, averages of the parameters (of the speaker input-output model) may be updated using the current parameter values. The update may be performing according to any of various known filtering schemes or combinations thereof.

Figure 6B:
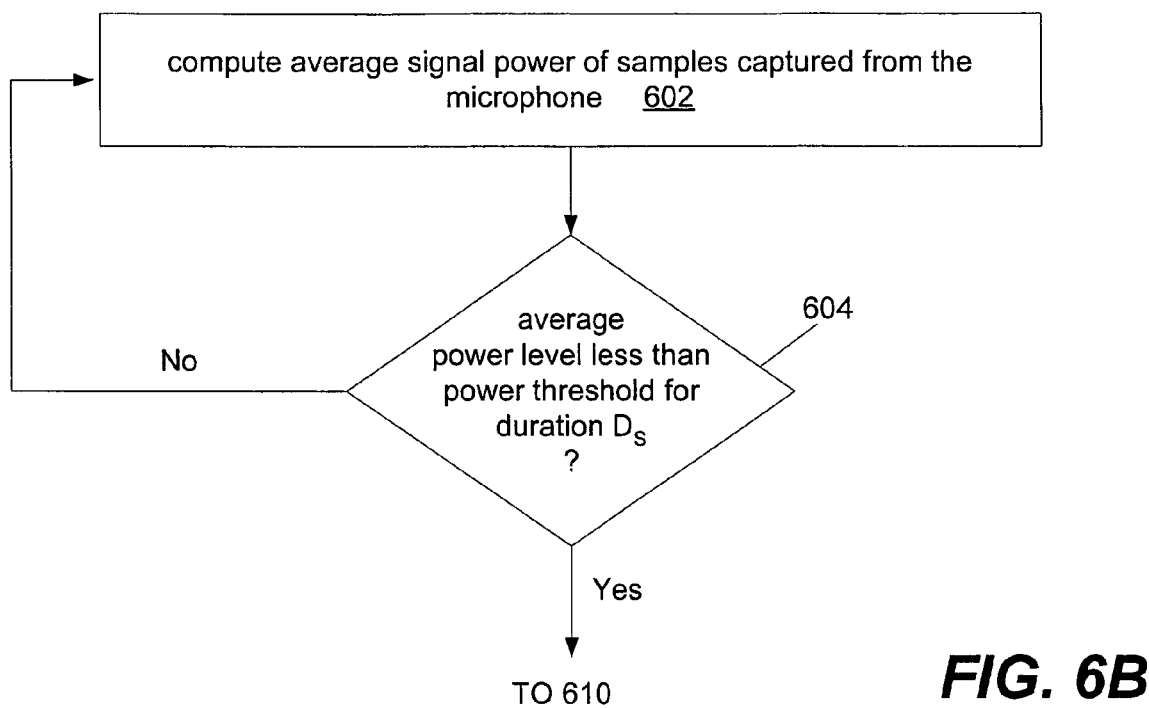
FIG. 6B illustrates one embodiment for monitoring average signal power from a microphone in order to control when a calibration experiment is to be performed.

The method may also include monitoring average signal power from the microphone, e.g., as illustrated in FIG. 6B. At 602, the average signal power of samples captured from the microphone may be computed. At 604, a test may be performed to determine if the average signal power has remained less than a power threshold for a predetermined amount of time $D_S$. The action 610, i.e., outputting the stimulus signal, may be performed in response to a determination that the average signal power from the microphone has remained less than the power threshold for the predetermined amount of time. Thus, the calibration experiment may be performed when the environment is sufficiently silent.

The parameter averages of the speaker input-output model are usable to perform echo cancellation, e.g., on inputs signals captured during a conversation. In one embodiment, the method also includes: receiving additional input signals from the microphone and performing echo cancellation on the additional input signals using the parameter averages.

The input-output model of the speaker may be a nonlinear model, e.g., a Volterra series model. Other types of nonlinear models may be used as well.

In some embodiments, the method may also include applying one or more notch filters to the stimulus signal, prior to transmission from the speaker, in order to remove one or more frequencies from the stimulus signal. The one or more frequencies may be frequencies that are known to induce resonance in one or more physical structures. For example, in embodiments where the method is implemented by a speakerphone, the one or more frequencies may include frequencies known to causes resonance of structures in the speakerphone and/or of structures in the environment of the speakerphone.

In one embodiment, the method may also include: performing an iterative search for a current transfer function of the microphone using the input signal spectrum, the spectrum of the stimulus signal, and the current parameter values; and updating an average microphone transfer function using the current transfer function. In one alternative embodiment, the updated parameters averages may be used instead of the current parameter values.

The average microphone transfer function may also be usable to perform echo cancellation.

In one embodiment, the actions 610 through 620 may be performed by one or more processors in a device such as a speakerphone, a video conferencing system, a speaker testing device, etc.

In some embodiments, a method for calibrating a system (including at least a speaker) may involve performing actions 612 through 620, under the assumption that some other mechanism arranges for the performance of action 610, i.e., outputting the stimulus signal.

Any of the various method embodiments disclosed herein (or any combinations thereof or portions thereof) may be implemented in terms of program instructions. The program instructions may be stored in (or on) any of various memory media. A memory medium is a medium configured for the storage of information. Examples of memory media include various kinds of magnetic media (e.g., magnetic tape or magnetic disk); various kinds of optical media (e.g., CD-ROM); various kinds of semiconductor RAM and ROM; various media based on the storage of electrical charge or other physical quantities; etc.

Furthermore, various embodiments of a system including a memory and a processor (or a set of processors) are contemplated, where the memory is configured to store program instructions and the processor is configured to read and execute the program instructions from the memory. In one embodiment, the program instructions are executable to implement:

(a) receiving an input signal from a microphone, where the input signal corresponds to a transmission of a stimulus signal from a speaker;
(b) computing a midrange sensitivity and a lowpass sensitivity for a transfer function $H(\omega)$ derived from a spectrum of the input signal and a spectrum of the stimulus signal;
(c) subtracting the midrange sensitivity from the lowpass sensitivity to obtain a speaker-related sensitivity;
(d) performing an iterative search for current values of parameters of an input-output model of the speaker using the input signal spectrum, the stimulus signal spectrum, the speaker-related sensitivity; and
(e) updating averages of the parameters of the speaker input-output model using the current parameter values.

The system may also include the speaker and the microphone. For example, embodiments of the system targeted for realization as a speakerphone may include the speaker and the microphone. In some embodiments, the system may be a speakerphone as described above in conjunction with FIG. 1B or FIG. 8. Thus, the program instructions may be stored in memory 209 and the processor 207 may perform actions (a) through (e).

The parameter averages of the speaker input-output model are usable to perform echo cancellation on other input signals, e.g., input signals captured from the microphone during a live conversation. In one embodiment, the program instructions are further executable to implement: receiving additional input signals, and performing echo cancellation on the additional input signals using the parameter averages.

The input-output model of the speaker may be a nonlinear model, e.g., a Volterra series model.

Updating Modeling Information Based on Online Data Gathering

In one set of embodiments, the processor 207 may be programmed to update the modeling information $I_M$ during periods of time when the speakerphone 200 is being used to conduct a conversation.

Suppose speakerphone 200 is being used to conduct a conversation between one or more persons situated near the speakerphone 200 and one or more other persons situated near a remote speakerphone (or videoconferencing system). In this case, the processor 207 sends out the remote audio signal R(k), provided by the remote speakerphone, as the digital output signal Y(k). It would probably be offensive to the local persons if the processor 207 interrupted the conversation to inject a noise transmission into the digital output stream Y(k) for the sake of self calibration. Thus, the processor 207 may perform its self calibration based on samples of the output signal Y(k) while it is "live", i.e., carrying the audio information provided by the remote speakerphone. The self-calibration may be performed as follows.

The processor 207 may start storing samples of the output signal Y(k) into an first FIFO and storing samples of the input signal X(k) into a second FIFO, e.g., FIFOs allocated in memory 209. Furthermore, the processor may scan the samples of the output signal Y(k) to determine when the average power of the output signal Y(k) exceeds (or at least reaches) a certain power threshold. The processor 207 may terminate the storage of the output samples Y(k) into the first FIFO in response to this power condition being satisfied. However, the processor may delay the termination of storage of the input samples X(k) into the second FIFO to allow sufficient time for the capture of a full reverb tail corresponding to the output signal Y(k) for a maximum expected room size.

The processor 207 may then operate, as described above, on a block $B_Y$ of output samples stored in the first FIFO and a block $B_X$ of input samples stored in the second FIFO in order to compute:

(1) current estimates for Volterra coefficients $a_i$ and $b_{ij}$;
(2) a current estimate $T_{mic}$ for the microphone transfer function;
(3) updates for the average Volterra coefficients $A_i$ and $B_{ij}$; and
(4) updates for the average microphone transfer function $H_{mic}$.

Because the block $B_X$ of received input samples is captured while the speakerphone 200 is being used to conduct a live conversation, the block $B_X$ is very likely to contain interference (from the point of view of the self calibration) due to the voices of persons and the presence of noise sources in the environment of the microphone 201. Thus, in updating the average values with the respective current estimates, the processor may strongly weight the past history contribution, i.e., more strongly than in those situations described above where the self-calibration is performed during periods of silence in the external environment.

Figure 6C:
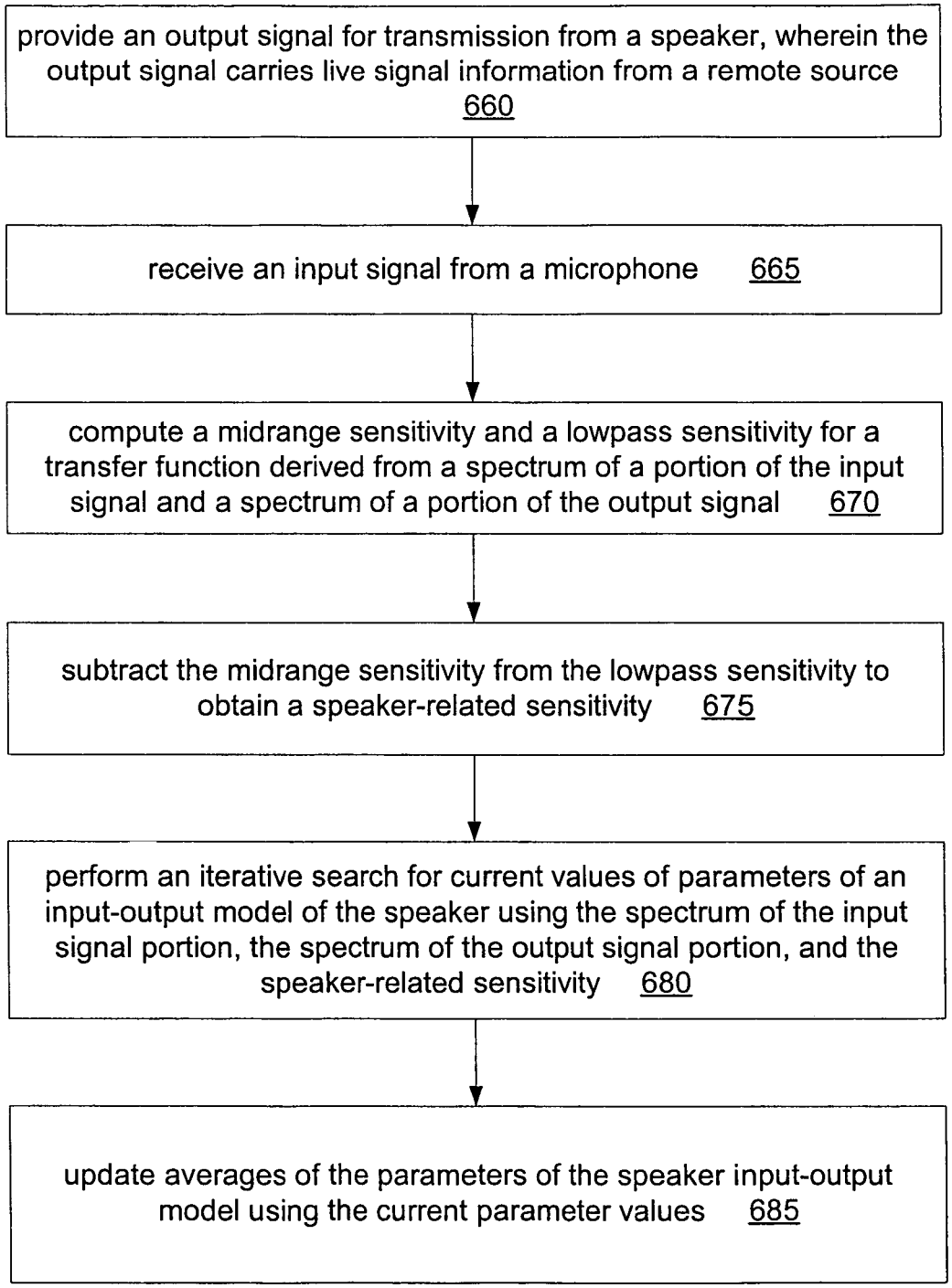
FIG. 6C illustrates one set of embodiments of a method for performing "live" calibration.

In one set of embodiments, a method for performing online calibration may include the actions illustrated in FIG. 6C.

At 660, an output signal may be provided for transmission from a speaker, where the output signal carries live signal information from a remote source (e.g., a remote speakerphone, telephone, videoconferencing system, cell phone, radio, a computer system, etc).

At 665, an input signal may be received from a microphone.

At 670, a midrange sensitivity and a lowpass sensitivity may be computed for a transfer function $H(\omega)$ derived from a spectrum of a portion of the input signal and a spectrum of a portion of the output signal.

At 675, the midrange sensitivity is subtracted from the lowpass sensitivity to obtain a speaker-related sensitivity.

At 680, an iterative search for current values of parameters of an input-output model of the speaker is performed using the spectrum of the input signal portion, the spectrum of the output signal portion, and the speaker-related sensitivity.

At 685, averages of the parameters of the speaker input-output model are updated using the current parameter values.

The parameter averages of the speaker input-output model are usable to perform echo cancellation on the input signal. In one embodiment, the method further comprises performing echo cancellation on the input signal in order to remove direct path and reflection copies of the output signal from the input signal, leaving a higher quality representation of the voice of local talkers (or local intelligence sources). The echo cancellation may use the parameter averages.

The method may further include: computing an average power signal on a stream of samples of the live signal information; and determining a window in time when the average power signal has remained greater than a power threshold for a predetermined amount of time. The portion of the output signal used to derive the transfer function $H(\omega)$ may correspond to samples of the live signal information during the window in time. Thus, the calibration experiment may be performed when the output signal has sufficient signal power.

The portion of the input signal used to derive the transfer function may correspond to the portion of the output signal and a reverb tail of the portion of the output signal.

In one embodiment, the method may further include: storing a plurality of portions of the output signal and corresponding portions of the input signal; and performing actions 670 through 685 a number of times. Each iteration of performing 670 through 685 may operate on one of the output signal portions and the corresponding input signal portion.

Rapid changes in one or more of the parameter averages over time may indicate a failure or problem in the speaker. In one embodiment, the updated parameter averages may be compared to previous values of the parameter averages, respectively. If any of the updated parameter averages departs by more than a corresponding predetermined amount from the corresponding previous value, a problem report for the speaker may be generated, e.g., a report indicating failure of the speaker or indicating a need for speaker maintenance. In another embodiment, time histories of the parameter averages, from repeated performances of 670 through 685, may be stored in memory. A numerical derivative may be computed on the time histories, and the derivatives used to determine if a problem or failure has occurred. Different types of problems will express themselves in different ways. Thus, the problem report may specify the type of problem that has occurred.

In some embodiments, one or more notch filters may be applied to the output signal prior to transmission from the speaker in order to remove one or more frequencies from the output signal. For example, frequencies known to induce resonance of one or more physical structures may be removed from the output signal. In embodiments of the method targeted for implementation in a speakerphone, the frequencies to be removed may be frequencies known to induce the resonance of structures (e.g., components) of the speakerphone or structure in the environment of the speakerphone.

The action of updating the parameter averages using the current parameter values may be performed according to any of various filtering schemes, e.g., according to an infinite impulse response (IIR) filtering scheme, a finite impulse response (FIR) scheme, a nonlinear filtering scheme, etc.

In one embodiment, the method may also include: performing an iterative search for a current transfer function of the microphone using the spectrum of the input signal portion, the spectrum of the output signal portion, and the updated parameter averages; and updating an average microphone transfer function using the current microphone transfer function. In one alternative embodiment, the current parameter values may be used instead of the updated parameter averages.

The average microphone transfer function is also usable in performing echo cancellation on the input signal.

The actions 660 through 685 may be performed by one or more processors in a device such as a speakerphone, a videoconferencing system, or a speaker-testing device.

The input-output model of the speaker may be a linear model or a nonlinear model (e.g., a Volterra series model).

Any of the various method embodiments disclosed herein (or any combinations thereof or portions thereof) may be implemented in terms of program instructions. The program instructions may be stored in (or on) any of various memory media. A memory medium is a medium configured for the storage of information. Examples of memory media include various kinds of magnetic media (e.g., magnetic tape or magnetic disk); various kinds of optical media (e.g., CD-ROM); various kinds of semiconductor RAM and ROM; various media based on the storage of electrical charge or other physical quantities; etc.

Furthermore, various embodiments of a system including a memory and a processor are contemplated, where the memory is configured to store program instructions and the processor is configured to read and execute the program instructions from the memory. In various embodiments, the program instructions encode corresponding ones of the method embodiments described herein (or combinations thereof or portions thereof). For example, in one embodiment, the program instructions are executable to implement:

(a) providing an output signal for transmission from a speaker, where the output signal carries live signal information from a remote source;

(b) receiving an input signal from a microphone;

(c) computing a midrange sensitivity and a lowpass sensitivity for a transfer function derived from a spectrum of a portion of the input signal and a spectrum of a portion of the output signal;

(d) subtracting the midrange sensitivity from the lowpass sensitivity to obtain a speaker-related sensitivity;

(e) performing an iterative search for current values of parameters of an input-output model of the speaker using the spectrum of the input signal portion, the spectrum of the output signal portion, and the speaker-related sensitivity; and (f) updating averages of the parameters of the speaker input-output model using the current parameter values.

The parameter averages are usable in performing echo cancellation on the input signal.

The system may also include the speaker and the microphone. For example, embodiments of the system targeted for realization as a speakerphone may include the speaker and the microphone. In some embodiments, the system may be a speakerphone as described above in conjunction with FIG. 1B or FIG. 8. Thus, the program instructions may be stored in memory 209 and the processor 207 may perform actions (a) through (f).

In one embodiment, the program instructions may be executable to further implement: performing an iterative search for a current transfer function of the microphone using the spectrum of the input signal portion, the spectrum of the output signal portion, and the current parameter values; and updating an average microphone transfer function using the current microphone transfer function. The average microphone transfer function is also usable in performing echo cancellation on the input signal.

In some embodiments, the system may include a plurality of microphones. Thus, actions (b) through (f) may be performed for each microphone. Thus, the speaker parameter averages may be averages over microphone index as well as averages over time. If all the microphones except one agree on the current parameter values, one can be fairly confident that a problem exists with that one microphone. Thus, the current parameter values determined using that one microphone may be excluded from the speaker parameter averages.

Plurality of Microphones

In some embodiments, the speakerphone 200 may include $N_M$ input channels, where $N_M$ is two or greater. Each input channel $IC_j$, j=1, 2, 3, ..., $N_M$ may include a microphone $M_j$, a preamplifier $PA_j$, and an A/D converter $ADC_j$. The description given herein of various embodiments in the context of one input channel naturally generalizes to $N_M$ input channels.

Microphone $M_j$ generates analog electrical signal $u_j(t)$. Preamplifier $PA_j$ amplifies the analog electrical signal $u_j(t)$ in order to generate amplified signal $x_j(t)$. A/D converter $ADC_j$ samples the amplified signal $x_j(t)$ in order to generate digital signal $X_j(k)$.

Figure 7:
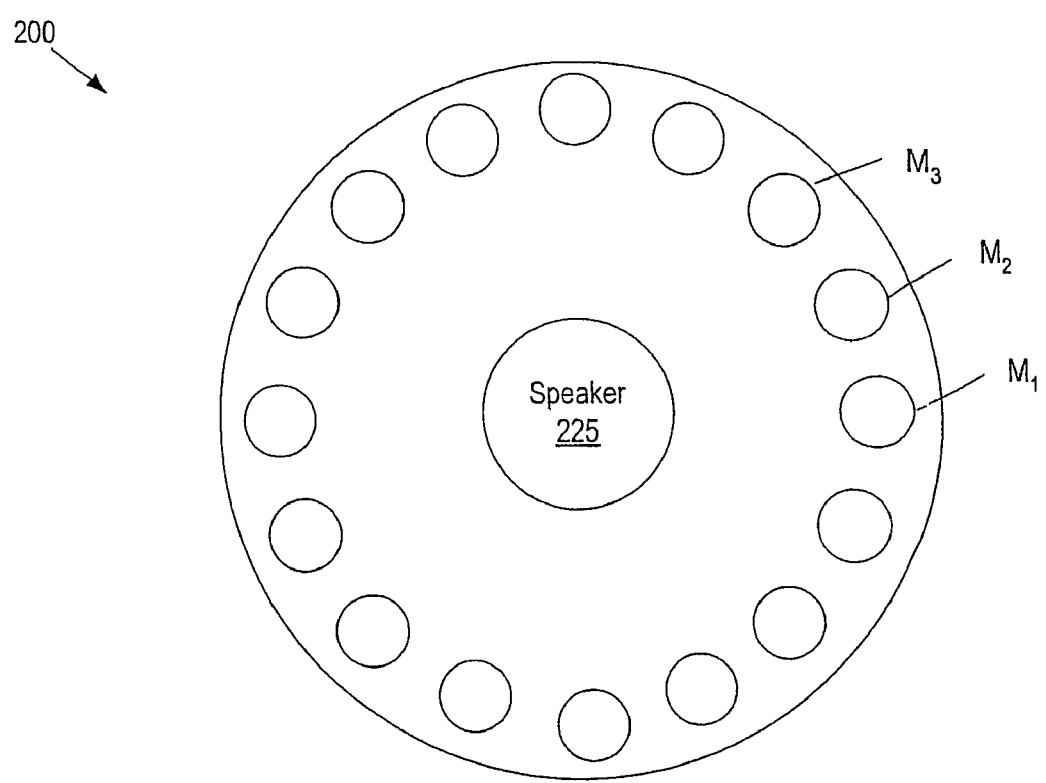
FIG. 7 illustrates one embodiment of speakerphone having a circular array of microphones.

In one group of embodiments, the $N_M$ microphones may be arranged in a circular array with the speaker 225 situated at the center of the circle as suggested by the physical realization (viewed from above) illustrated in FIG. 7. Thus, the delay time To of the direct path transmission between the speaker and microphone $M_j$ is approximately the same for all microphones. In one embodiment of this group, the microphones may all be omni-directional microphones having approximately the same microphone transfer function.

Processor 207 may receive the digital input signals $X_j(k)$, j=1, 2, ..., $N_M$, and perform acoustic echo cancellation on each channel independently based on calibration information derived from each channel separately.

In one embodiment, $N_M$ equals 16. However, a wide variety of other values are contemplated for $N_M$.

Direct Path Signal Cancellation Before AEC

Figure 8:
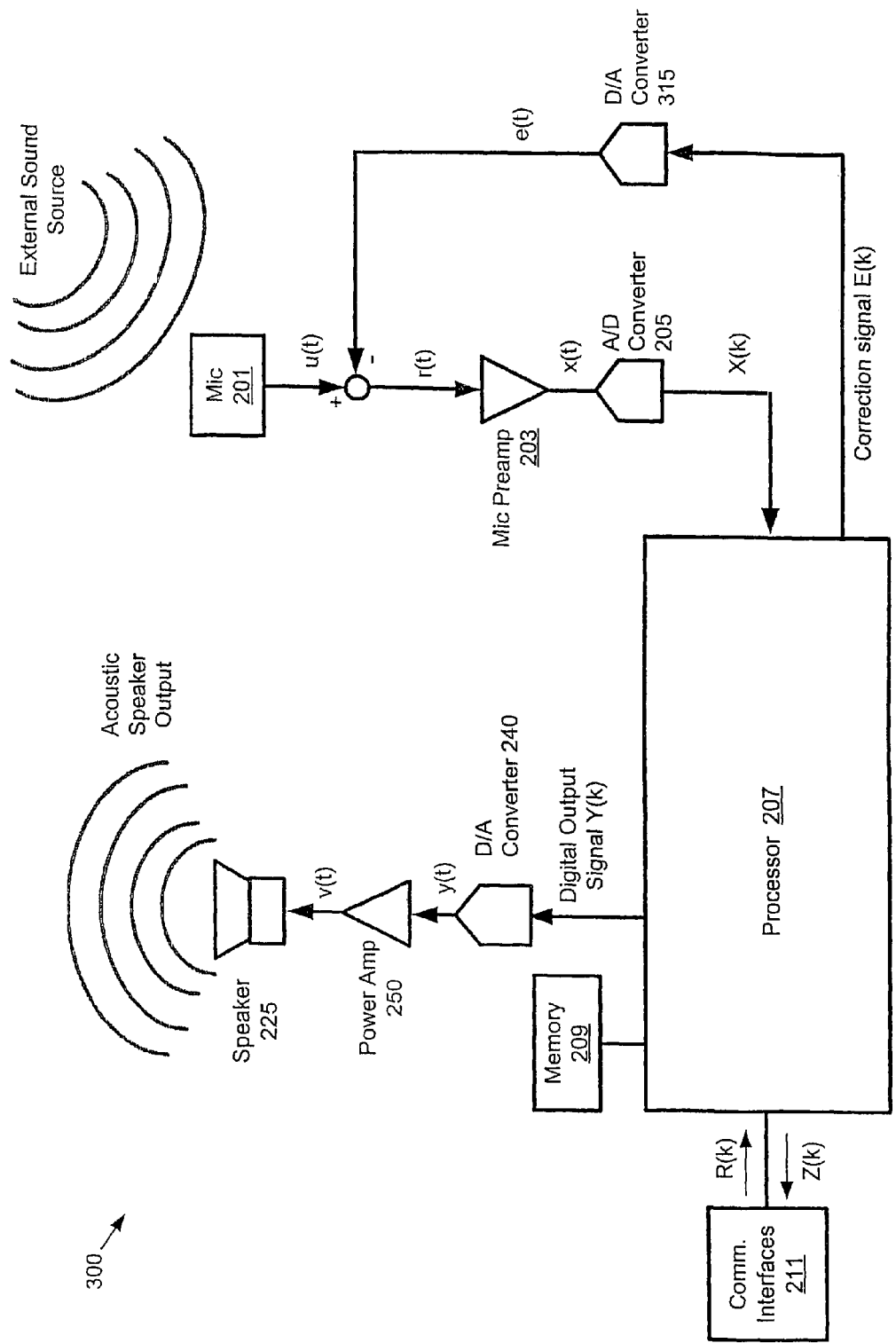
FIG. 8 illustrates one set of embodiments of a speakerphone 300 configured to cancel a direct path signal from to input preamplification.

In some embodiments, a speakerphone 300 may be configured as illustrated in FIG. 8. The reader will observe that speakerphone 300 is similar in many respects to speakerphone 200 (illustrated in FIG. 1B). However, in addition to the components illustrated in FIG. 1B as part of speakerphone 200, speakerphone 300 includes a subtraction circuit 310 and a D/A converter 315. The subtraction circuit 310 is coupled to receive:

the electrical signal u(t) generated by the microphone 201, and the analog signal e(t) generated by the D/A converter 315. The subtraction circuit 310 generates a difference signal r(t)= u(t)-e(t). The difference signal r(t) is provided to preamplifier circuit 203. Note that digital-to-analog (D/A) converter 315 generates the signal e(t) from digital signal E(k) and that the digital signal E(k) is provided by processor 207.

The preamplifier circuit 203 amplifies the difference signal r(t) to generate an amplified signal x(t). The gain of the preamplifier circuit is adjustable within a specified dynamic range. Analog-to-digital converter 205 converts the amplified signal x(t) into a digital input signal X(k). The digital input signal X(k) is provided to processor 207.

The processor 207 receives a remote audio signal R(k) from another speakerphone (e.g., via one or more of the communication interfaces 211) and mixes the remote audio signal R(k) with any locally generated signals (e.g., beeps or tones) to generate a digital output signal Y(k).

The digital-to-analog converter 240 receives the digital output signal Y(k) and converts this signal into an analog electrical signal y(t). The power amplifier 250 amplifies the analog electrical signal y(t) to generate an amplified signal v(t). The amplified signal v(t) is used to drive a speaker 225. The speaker 225 converts the amplified signal v(t) into an acoustic signal. The acoustic signal generated by the speaker radiates into the ambient space, and thus, local participants are able to hear a replica of the acoustic signals generated by remote participants (situated near a remote speakerphone).

Figure 8B:
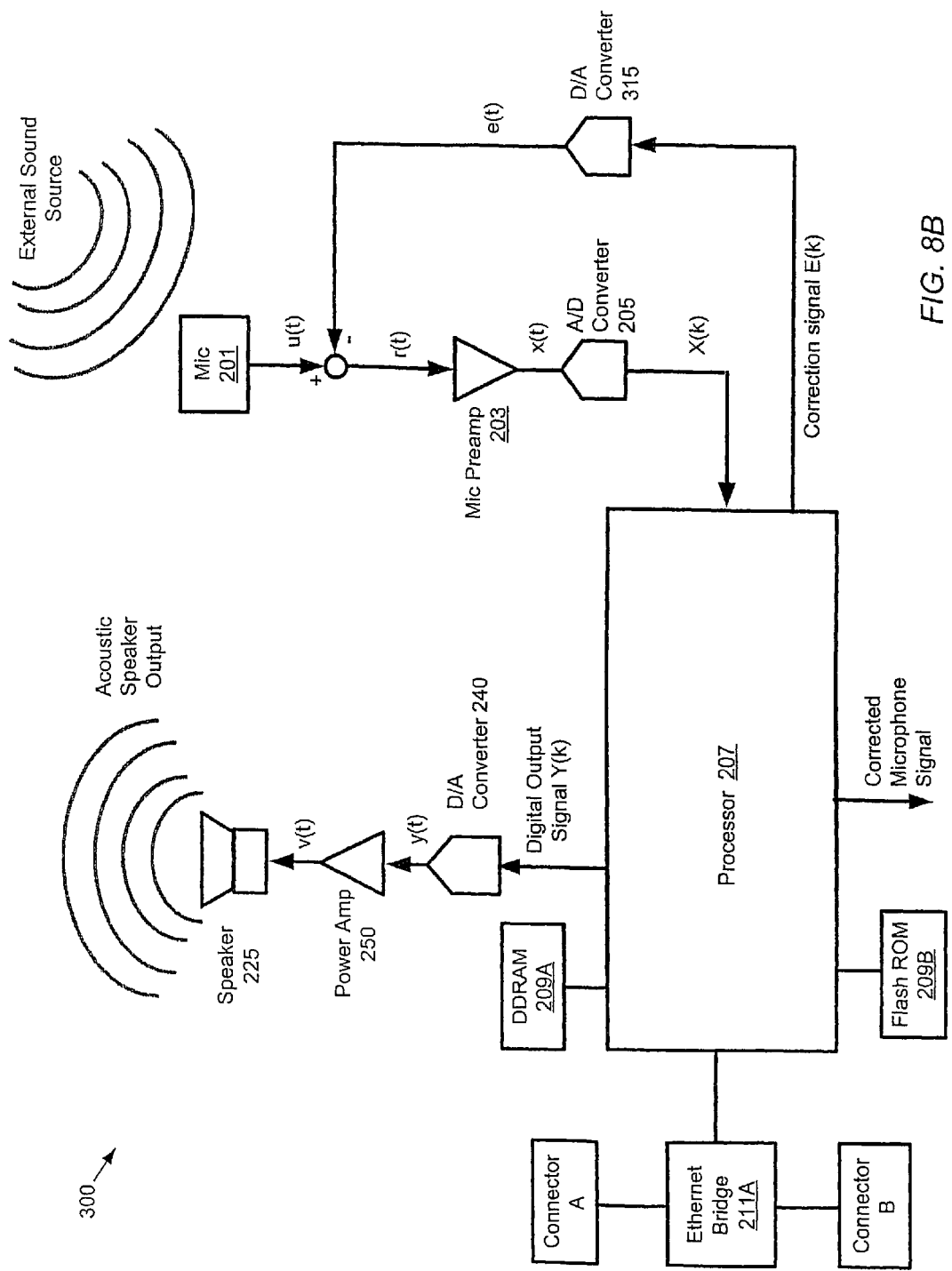
FIG. 8B illustrates one embodiments of the speakerphone 300 having an Ethernet bridge.

FIG. 8B illustrates one embodiment of the speakerphone 300 which includes (among other things) an Ethernet bridge 211A, DDRAM 209A and Flash ROM 209B. The Ethernet bridge may couple to two connectors A and B.

In general, the microphone signal u(t) is a superposition of contributions due to:

acoustic signals (e.g., voice signals) generated by one or more persons (e.g., conference participants) in the environment of the speakerphone 300, and reflections of these acoustic signals off of acoustically reflective surfaces in the environment;

acoustic signals generated by one or more noise sources (such as fans and motors, automobile traffic and fluorescent light fixtures) and reflections of these acoustic signals off of acoustically reflective surfaces in the environment; and the acoustic signal generated by the speaker 225 and the reflections of this acoustic signal off of acoustically reflective surfaces in the environment.

Let $u_{dp}(t)$ denote the contribution to u(t) that corresponds to the direct path transmission between speaker 225 and the microphone 201. (See FIG. 2.)

Figure 9:
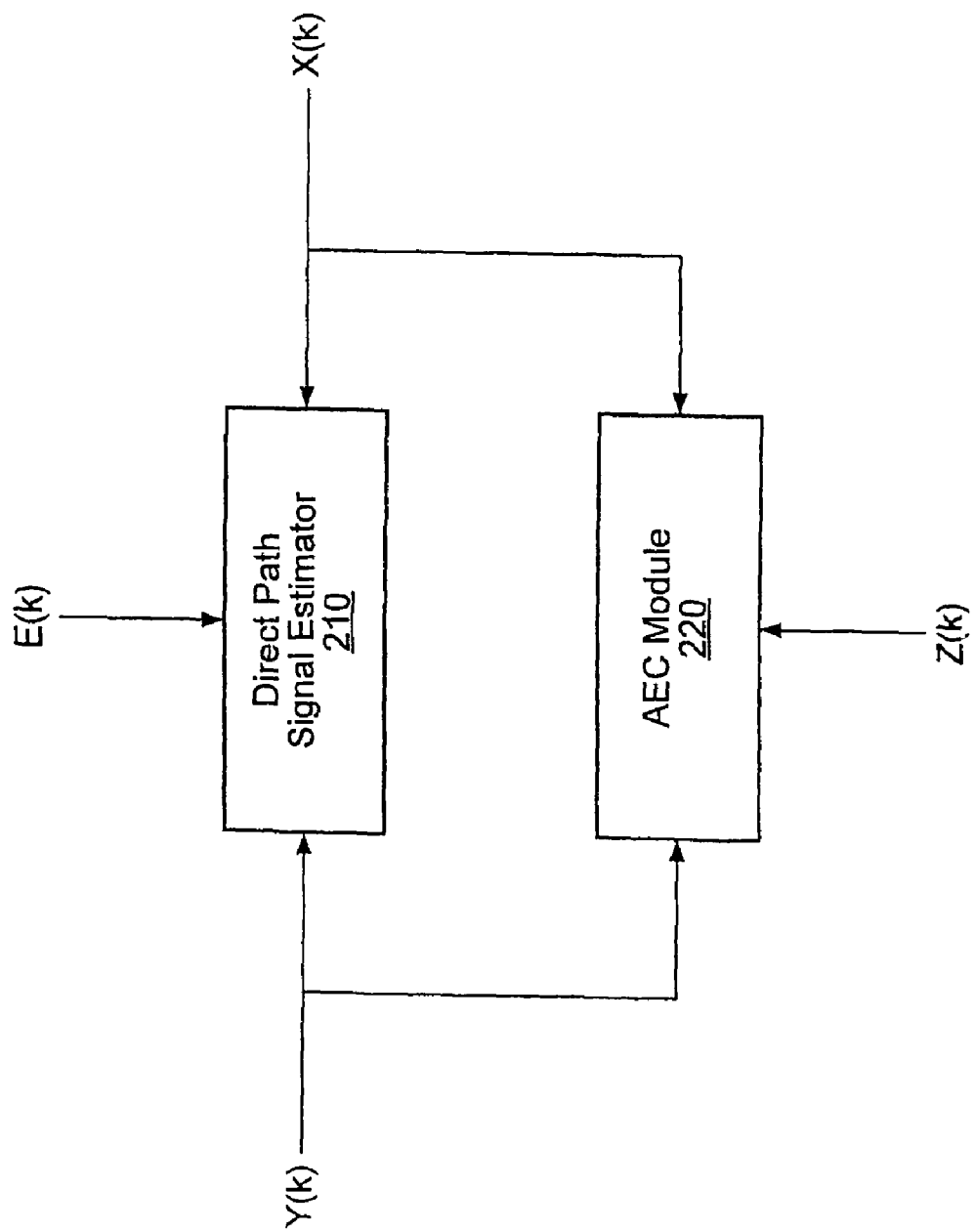
FIG. 9 illustrates one embodiment of a software block diagram that may be executed by processor 207.

Processor 207 may be configured to execute software including a direct path signal estimator 210 (hereinafter referred to as the DPS estimator) and an acoustic echo cancellation (AEC) module 220, e.g., as suggested in FIG. 9. The DPS estimator and AEC module may be stored in memory 209.

The DPS estimator 210 may attempt to generate the digital signal E(k) so that the corresponding analog signal e(t) is a good approximation to the direct path contribution $u_{dp}(t)$. In some embodiments, the DPS estimator may employ a method for generating digital signal E(k) that guarantees (or approximates) the condition:

$$\text{Energy}[e(t)-u_{dp}(t)]/\text{Energy}[u_{dp}(t)] < \text{epsilon},$$

where epsilon is a small positive fraction. The notation Energy[f(t)] represents the energy of the signal f(t) considered over a finite interval in time.

Because e(t) captures a substantial portion of the energy in the direct path contribution $u_{dp}(t)$, the subtraction r(t)=u(t)−e(t) implies that only a small portion of the direct path contribution $u_{dp}(t)$ remains in r(t). The direct path contribution $u_{dp}(t)$ is typically the most dominant contribution to the microphone signal u(t). Thus, the subtraction of e(t) from the microphone signal u(t) prior to the preamplifier 203 implies that the average power in difference signal r(t) is substantially less than the average power in u(t). Therefore, the gain of the preamplifier may be substantially increased to more effectively utilize the dynamic range of the A/D converter 205 when the DPS estimator 210 is turned on. (When the DPS estimator is off, e(t)=0 and r(t)=u(t).)

Note that the digital input signal X(k) is obtained from r(t) by scaling and sampling. Thus, it is apparent that the digital input signal X(k) would have a direct path contribution $X_{dp}(k)$, linearly related to $u_{dp}(t)$, if the DPS estimator 210 were turned off, i.e., if r(t)=u(t). However, only a small portion of the direct path contribution $X_{dp}(k)$ remains in X(k) when the DPS estimator 210 is on, i.e., if r(t)=u(t)−e(t). Any remaining portion of the direct path contribution $X_{dp}(k)$ in digital input signal X(k) may fall below the threshold for consideration by the AEC module 220. (In one embodiment, the AEC module 220 may employ a threshold for deciding which peaks in the power spectrum of X(k) are sufficiently large to warrant analysis.) Thus, the AEC module 220 will concentrate its computational effort on estimating and canceling the reflected path contributions.

Because the AEC module 220 doesn't have to deal with the direct path contribution, the AEC module is able to analyze a larger number of the reflected path contributions than if it did have to deal with the direct path contribution. Furthermore, because the AEC module doesn't have to deal with the direct path contribution, the AEC module is able to set its dynamic range adjustment parameters in a manner that gives more accurate results in its analysis of the reflected path contributions than if the direct path signal estimator 210 were turned off. (If the direct path estimator 210 were turned off, the direct path contribution $X_{dp}(k)$ to the digital input X(k) would greatly dominate the contributions due to the reflected paths.)

From the point-of-view of the AEC module 220, the path with minimum propagation time (between speaker and microphone) is the first reflected path, i.e., the reflected path having the smallest path length, because the direct path is substantially eliminated from the digital input X(k). The propagation time $\tau_1$ of the first reflected path is larger than the propagation time $\tau_0$ of the direct path. Thus, the AEC module 220 may operate on larger blocks of the samples X(k) than if the DPS estimator 210 were turned off. The larger blocks of samples implies greater frequency resolution in the transform domain. Greater frequency resolution implies a high-quality of cancellation of the reflected paths.

In various embodiments, the DPS estimator 210 receives signal Y(k) and operates on the signal Y(k) using at least a subset of the modeling information $I_M$ to generate the signal E(k). In one embodiment, the DPS estimator 210 may operate on the signal Y(k) using:
    the gain of the D/A converter 240;
    the gain of the power amplifier 250;
    the input-output model for the speaker 225;
    the transfer function $H_{dp}$ for the direct path transmission between the output of speaker 225 and the input of microphone 201;
    the transfer function of the microphone 201;
    the gain of the preamplifier 203; and
    the gain of the A/D converter 205.

The DPS estimator 210 also receives the digital input X(k). Using blocks of the samples X(k) and corresponding blocks of the samples Y(k), the DPS estimator 210 may periodically update the transfer function $H_{dp}$. For example, in some embodiments, the DPS estimator 210 may generate a new estimate of the transfer function $H_{dp}$ for each received block of digital input X(k). The transfer function $H_{dp}$ may be characterized by an attenuation coefficient and a time delay for the direct path transmission.

The AEC module 220 receives the digital input X(k) and the digital output Y(k), generates an error signal C(k), and subtracts the error signal C(k) from the digital input X(k) to obtain a corrected signal Z(k). The corrected signal Z(k) may be transmitted to a remote speakerphone through the communication mechanism CM. When the direct path signal estimator 210 is turned on, error signal C(k) generated by the AEC module is an estimate of the portion of X(k) that is due to a number $N_{on}$ of the most dominant reflected path transmissions between the speaker and the microphone. When the direct path signal estimator 210 is turned off, the error signal C(k) generated by the AEC module is an estimate of the portion of X(k) that is due to the direct path and a number $N_{off}$ of the most dominant reflected path transmissions between the speaker and the microphone. As alluded to above, when the DPS estimator 210 is on, the direct path contribution is substantially eliminated from the signal X(k) arriving at the AEC module 220 (by virtue of the subtraction occurring at subtraction circuit 310). Thus, the AEC module 220 does not have to deal with the direct path contribution and is able to devote more of its computational resources to analyzing the reflected path contributions. Thus, $N_{on}$ is generally larger than $N_{off}$.

The AEC module 220 may operate on the digital signal Y(k) using at least a subset of the modeling information $I_M$ in order to generate the error signal C(k). In one embodiment, the AEC module 220 may operate on the digital signal Y(k) using:
    the gain of the D/A converter 240;
    the gain of the power amplifier 250;
    the apparent transfer function $H_{app}$ between the output of speaker 225 and the input of microphone 201;
    the transfer function of the microphone 201;
    the gain of the preamplifier 203;
    the gain of the A/D converter 205.
Note that the apparent transfer function $H_{app}$ models only reflect paths between the speaker and microphone when the direct path signal estimator 210 is turned on.

Figure 9B:
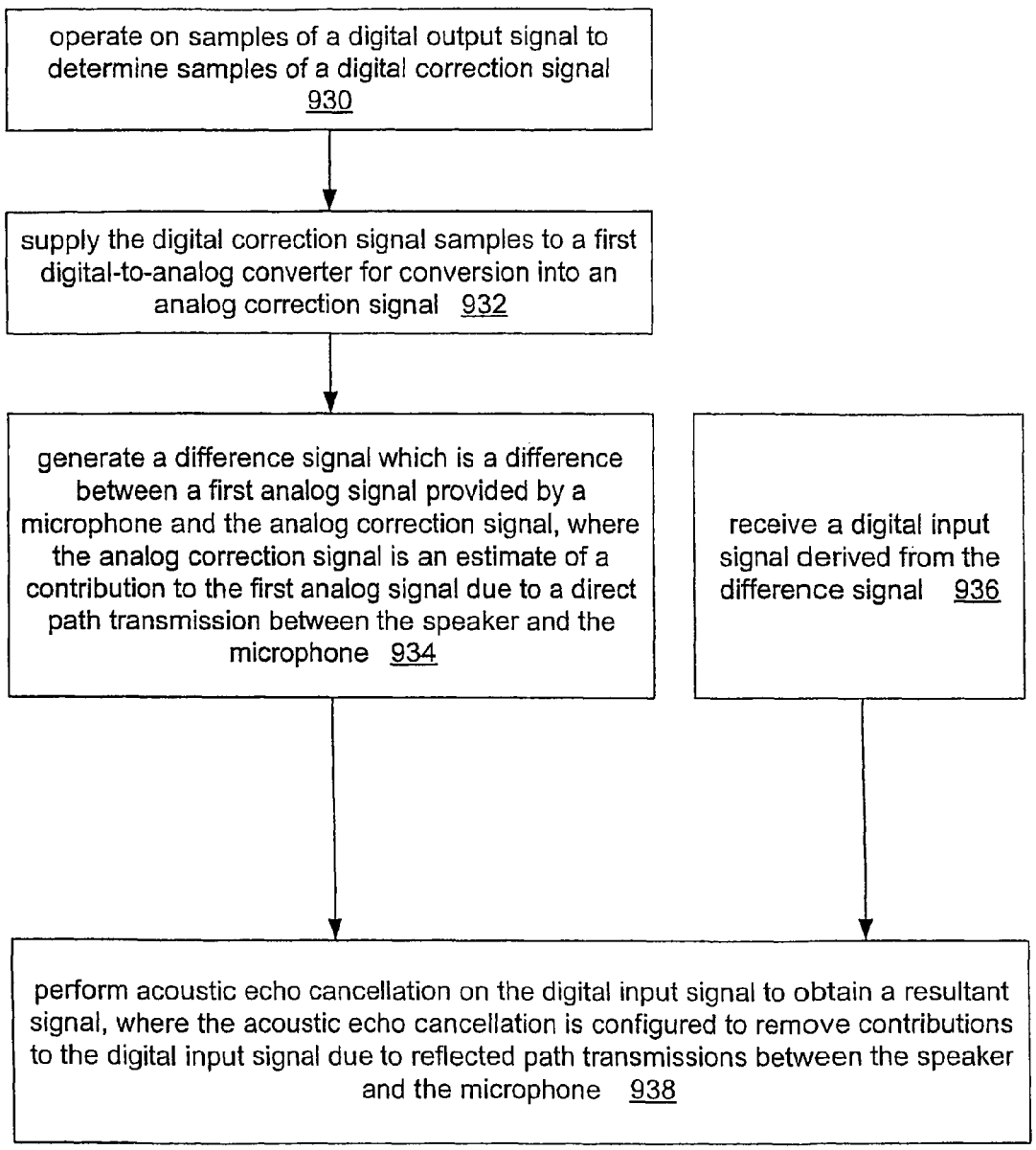
FIG. 9B illustrates one embodiment of a method for canceling speaker signal energy from a received microphone signal.

In some embodiments, a method for canceling speaker signal energy from a received microphone signal may be enacted as illustrated in FIG. 9B.

At 930, samples of a digital output signal may be operated on to determine samples of a digital correction signal. The output signal samples are samples that are (or have been) directed to an output channel for transmission from a speaker.

At 932, the digital correction signal samples may be supplied to a first digital-to-analog converter for conversion into an analog correction signal.

At 934, a difference signal which is a difference between a first analog signal provided by a microphone and the analog correction signal may be generated (e.g., by an analog subtraction circuit), where the analog correction signal is an estimate of a contribution to the first analog signal due to a direct path transmission between the speaker and the microphone.

At 936, a digital input signal derived from the difference signal may be received from an input channel.

At 938, acoustic echo cancellation may be performed on the digital input signal to obtain a resultant signal. The acoustic echo cancellation may be configured to remove contributions to the digital input signal due to reflected path transmissions between the speaker and the microphone.

Such a method may be especially useful for speakerphones and videoconferencing system where a speaker and a microphone may be located close to each other, e.g., on the housing of the speakerphone (or videoconferencing system).

Figure 10:
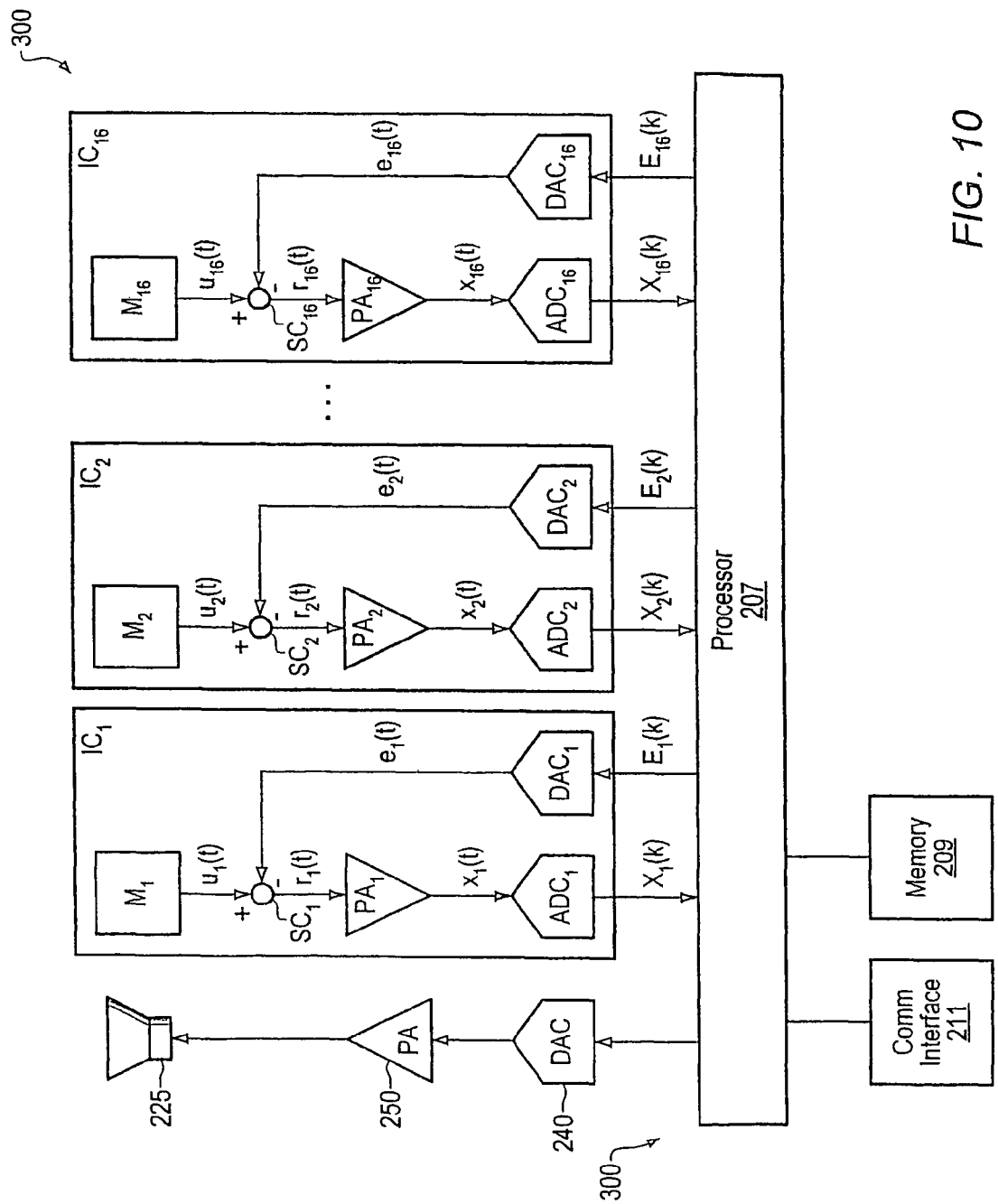
FIG. 10 illustrates one embodiment of speakerphone 300 configured to perform a separate direct path cancellation on each microphone input channel.

In one set of embodiments, the speakerphone 300 may include a set of $N_M$ input channels. Each input channel $IC_j$, $j=1, 2, 3, \ldots, N_M$, may include a microphone $M_j$, a subtraction circuit $SC_j$, a preamplifier $PA_j$, an A/D converter $ADC_j$, and a D/A converter $DAC_j$. The integer $N_M$ is greater than or equal to two. The description given above of canceling the direct path contribution prior to the preamplifier 203 for one microphone channel naturally extends to $N_M$ microphone channels. FIG. 10 illustrates speakerphone 300 in the case $N_M=16$.

Let $u_j(t)$ denote the analog electrical signal captured by microphone $M_j$. Subtraction circuit $SC_j$ receives electrical signal $u_j(t)$ and a corresponding correction signal $e_j(t)$ and generates a difference signal $r_j(t)=u_j(t)-e_j(t)$. Preamplifier $PA_j$ amplifies the difference signal $r_j(t)$ to obtain an amplified signal $x_j(t)$. A/D converter $ADC_j$ samples the amplified signal $x_j(t)$ in order to obtain a digital signal $X_j(k)$. The digital signals $X_j(k)$, $j=1, 2, \ldots, N_M$, are provided to processor 207.

Processor 207 generates the digital correction signals $E_j(k)$, $j=1, 2, \ldots, N_M$. D/A converter $DAC_j$ converts the digital correction signal $E_j(k)$ into the analog correction signal $e_j(t)$ which is supplied to the subtraction circuit $SC_j$. Thus, the processor 207 may generate an independent correction signal $E_j(k)$ for each input channel $IC_j$ as described in the embodiments above.

Figure 10B:
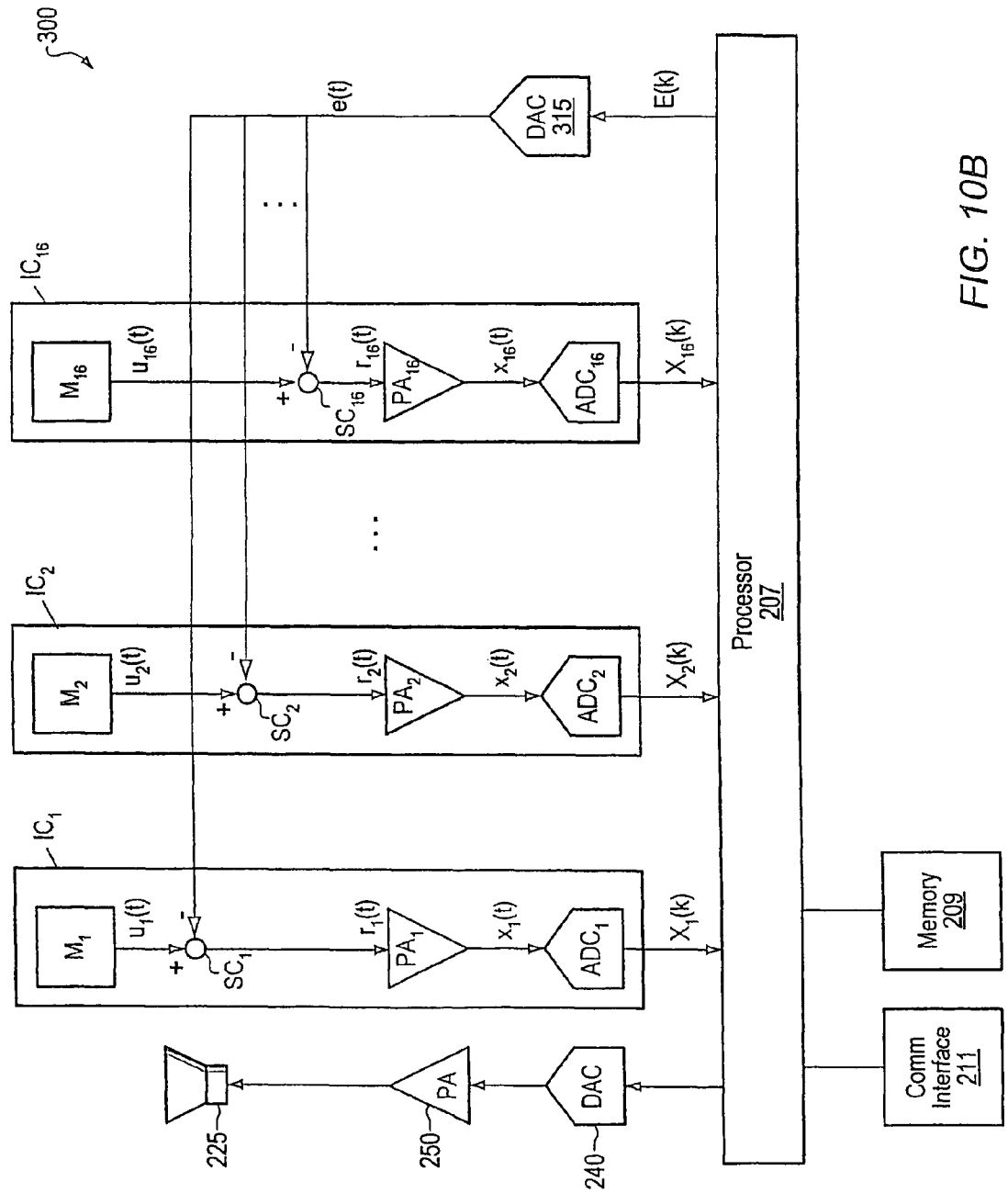
FIG. 10B illustrates one embodiment of speakerphone 300 configured to generate a single cancellation signal which is applied to all microphone input channels.

In one group of embodiments, the $N_M$ microphones may be arranged in a circular array with the speaker 225 situated at the center of the circle, e.g., as suggested in FIG. 7. Thus, the delay time $\tau_0$ of the direct path transmission between the speaker and each microphone is approximately the same for all microphones. Furthermore, the attenuation coefficient of the direct path transmission between the speaker and each microphone may be approximately the same for all microphones (since they all have approximately the same distance from the center). The microphones may be configured to satisfy the condition of having approximately equal microphone transfer functions. This condition may be easier to satisfy if the microphones are omnidirectional microphones. In some embodiments, the processor 207 may apply the same correction signal $e(t)$ to each input channel, i.e., $r_j(t)=u_j(t)-e(t)$ for $j=1, 2, 3, \ldots, N_M$. (FIG. 10B illustrates the case $N_M=16$.) In these embodiments, the speakerphone 300 may have a D/A converter 315 which is shared among all input channels instead of $N_M$ digital-to-analog converters as described above. Thus, the processor 207 may generate a single digital correction signal $E(k)$ and supply the single correction signal $E(k)$ to the D/A converter 315. The D/A converter 315 converts the correction signal $E(k)$ into the analog correction signal $e(t)$ which is fed to all the subtractions units $SC_j$, $j=1, 2, \ldots, N_M$.

In one embodiment, $N_M$ equals 16. However, a wide variety of other values are contemplated for $N_M$.

In some embodiments, other microphone array configurations may be used (e.g., square, rectangular, elliptical, etc.).

In one set of embodiments, speakerphone 300 may be configured to generate a correction signal $E(k)$ from the digital output signal $Y(k)$ by:

(a) multiplying the digital output signal $Y(k)$ by the gain of the D/A converter 240 and the gain of the power amplifier 250 to obtain a digital representation $v(k)$ of the speaker input signal;
(b) applying a nonlinear speaker model to the digital representation $v(k)$ to obtain a digital representation $R_{SP}(k)$ of the acoustic signal radiated by the speaker 225;
(c) applying the transfer function $H_{dp}$ (of the direct path transmission from the speaker 225 to the microphone 201) to the digital representation $R_{SP}(k)$ to obtain a digital representation $A_{MIC}(k)$ of the acoustic signal received by the microphone;
(d) applying the microphone transfer function to the digital representation $A_{MIC}(k)$ in order to obtain a digital representation $u(k)$ of the microphone output signal;
(e) multiplying the digital representation $u(k)$ by the reciprocal of the gain of the D/A converter 315.

Applying the transfer function $H_{dp}$ to the digital representation $R_{SP}(k)$ may involve:

delaying the digital representation $R_{SP}(k)$ by the time delay $\tau_0$ of the direct path transmission, and
scaling by the attenuation coefficient of the direct path transmission.

The parameters of the nonlinear speaker model and the microphone transfer function may change over time. Thus, the processor 207 may repeatedly update the model parameters and the microphone transfer function in order to track the changes over time. Various embodiments for updating the speaker model parameters and the microphone transfer function are described above.

Similarly, the speaker 225 and/or the microphone 201 may move, and thus, the transfer function $H_{dp}$ may change over time. Thus, the processor 207 may repeatedly update the transfer function $H_{dp}$ as needed (e.g., periodically or intermittently). The time delay $\tau_0$ of the direct path transmission may be estimated based on a cross correlation between the output signal $Y(k)$ and the input signal $X(k)$. In one embodiment, the attenuation coefficient of the direct path transmission may be estimated based on a calibration experiment performed during a period of time when the speakerphone is not being used for communication and when the environment is relatively silent.

In one set of embodiments, the analog correction signal $e(t)$ may be subtracted from raw signal $u(t)$ coming from the microphone prior to the preamplifier 203. In another set of embodiments, the analog correction signal may be subtracted after the preamplifier and prior to the A/D converter 205. In one alternative embodiment, the digital correction signal $E(k)$ may be subtracted (in the digital domain) after the A/D converter 205 (and never converted into an analog signal).

In yet another set of embodiments, the analog correction signal $e(t)$ may be converted into an acoustic correction signal using a small acoustic transducer (e.g., speaker) situated close to the microphone 201. This acoustic cancellation methodology has the advantage of protecting the microphone itself from clipping due to high volume sounds from the speaker 225.

In some embodiments, the speakerphone 300 may have one or more microphones and one or more speakers arranged in a fixed configuration, e.g., mounted into the speakerphone housing. In other embodiments, the one or more microphones and one or more microphones may be movable, e.g., connected to the base unit by flexible wires and/or wireless connections. In yet other embodiments, some subset of the speakers and/or microphones may be fixed and another subset may be movable. The method embodiments described herein for canceling the direct path contribution to a microphone signal prior to preamplification (or prior to A/D conversion) may be applied to each microphone channel regardless of whether the corresponding microphone is fixed or movable.

Cancellation of the direct path contribution from the raw microphone signal u(t) may:

- allow the usable dynamic range of the signal x(t) is be increased by increasing the gain of the preamplifier 203;
- reduce the closed loop gain of speaker-to-mic system;
- improve echo canceller effectiveness by eliminating strong peaks in the speaker-to-mic transfer function;
- allow the speaker 225 to be driven at a louder volume and the sensitivity of the microphone 201 to be increased without clipping at the A/D converter 205, therefore allowing the speakerphone 300 to function in larger rooms with larger effective range because speaker 225 is louder and microphone 201 is more sensitive;
- allow use of omnidirectional microphones instead of directional microphones (such as cardioid or hypercardioid microphones).

Omnidirectional microphones are less expensive, more reliable and less sensitive to vibration than directional microphones. Use of directional microphones is complicated by the directional dependence of their frequency response. Omnidirectional microphones do not have this complication. Omnidirectional microphones do not experience the proximity effect (this helps with dynamic range). Omnidirectional microphones are smaller for the same sensitivity as directional microphones, therefore allowing a smaller housing than if directional microphones were used.

In one set of embodiments, the correction signal E(k) may be determined as follows. The processor 207 may measure the transfer function $H_{dp}$ of the direct path transmission between the speaker 225 and the microphone 201, e.g., by asserting a noise burst as the output signal Y(k) (for transmission from the speaker 225) and capturing the resulting signal X(k) from the A/D converter 205. If this measurement is being performed in an environment having nontrivial echoes, the processor 207 may reduce the duration of noise burst until the tail edge of the noise burst arrives at the microphone 201 prior to the leading edge of the first room reflection. The processor 207 may assert the same noise burst repeatedly in order to average out the effects of other random acoustic sources in the room and the effects of circuit noise in the input channel (e.g., in the summation circuit 310, the preamplifier 203 and the A/D converter 205).

The processor 207 may determine the minimum time interval between successive noise bursts based on the time it takes for the room reverberation due to a single noise burst to die down to an acceptably low level.

The processor 207 may perform a cross correlation between the noise stimulus Y(k) with measured response X(k) to determine the time delay $\tau_0$ between stimulus and response. In particular, the time delay $\tau_0$ may be determined by the delay value which maximizes the cross correlation function.

Figure 11:
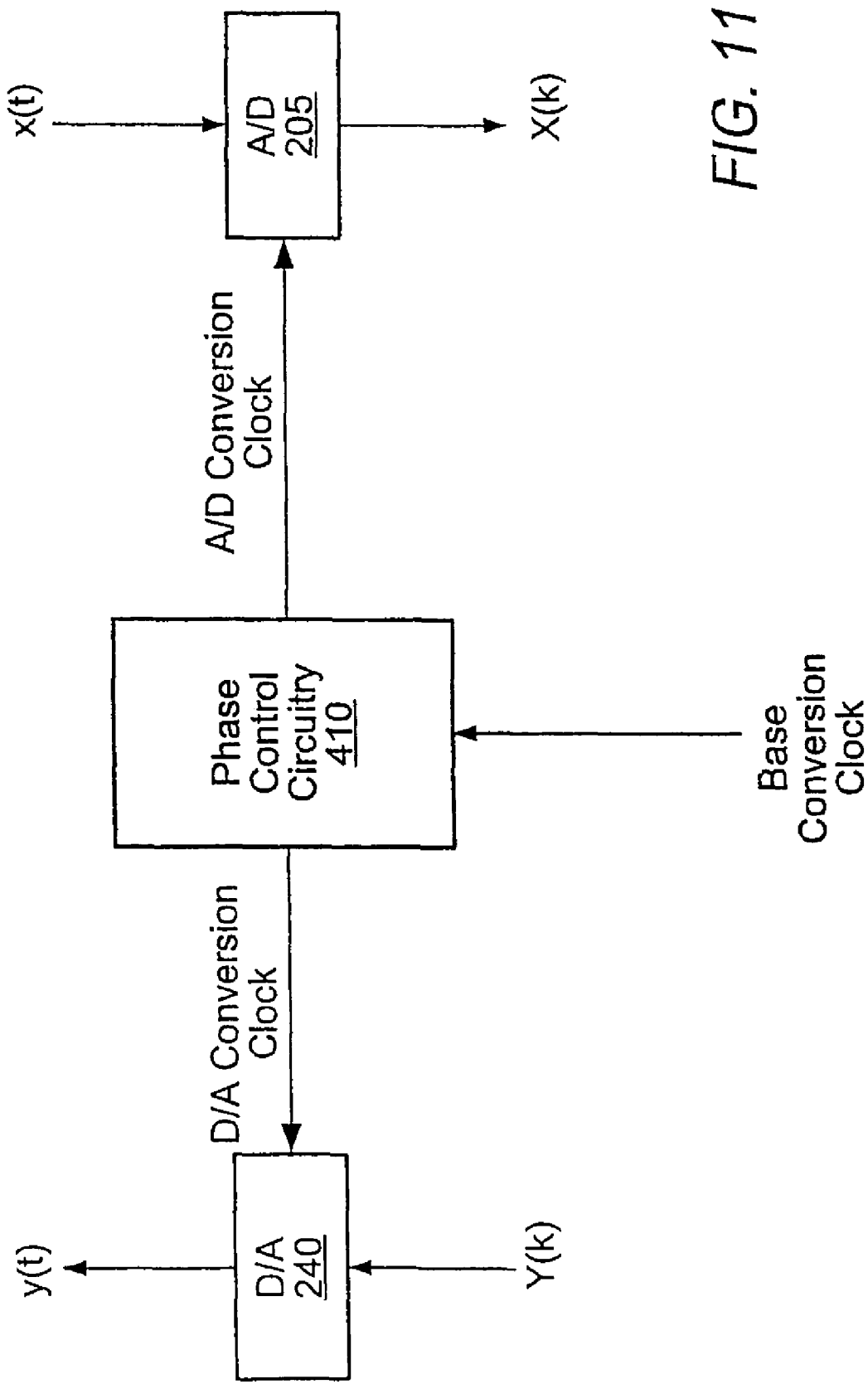
FIG. 11 illustrates circuitry to shift the phases of an A/D conversion clock and a D/A conversion clock relative to a base conversion clock.

In some embodiments, the precision of the measurement of time delay $\tau_0$ may be improved by adjusting the phase offset of the A/D converter 205 and/or the phase offset of the D/A converter 240 relative to a base conversion clock. The speakerphone 300 includes circuitry 410 to control the phase $\theta_{A/D}$ of the A/D conversion clock relative to the base conversion clock and the phase $\theta_{D/A}$ of the D/A conversion clock relative to the base conversion clock as suggested in FIG. 11. The A/D conversion clock is supplied to the A/D converter 205 and controls when sampling events occur. The D/A conversion clock is supplied to the D/A converter 240 and controls when D/A conversion events occur. The frequency $f_{conv}$ of the base conversion clock may be greater than or equal to the Nyquist rate for speech signals (or for audio signals in some embodiments). For example, in one embodiment the frequency $f_{conv}$ may equal 16 kHz.

After having located the integer sample index $k_{max}$ that maximizes the cross correlation, the processor 207 may:

(a) select a value of phase $\theta_{D/A}$;
(b) apply the selected phase value, e.g., by supplying the selected phase value to the phase control circuitry 410;
(c) transmit the noise burst as the output signal Y(k);
(d) capture the response signal X(k) from the D/A converter 205;
(e) compute the cross correlation value (between the noise burst and the response signal) corresponding to the integer sample index $k_{max}$;
(f) store the computed cross correlation value for further analysis.

The processor 207 may repeat (a) through (f) for successive values of phase $\theta_{D/A}$ spanning a range of angles, e.g., the range from −180 to 180 degrees. Furthermore, the processor may analyze the successive cross correlation values to determine the value $\theta_{max}$ of the phase $\theta_{D/A}$ that gives the maximum cross correlation value. The processor 207 may compute a refined estimate of the time delay To using the integer sample index $k_{max}$ and the phase value $\theta_{max}$. For example, in one embodiment, the processor 207 may compute the refined estimate according to the expression:

$$\tau_0 = k_{max} + \theta_{max}/360.$$

In one set of embodiments, the processor 207 may increment the value of phase $\theta_{D/A}$ by the angle $(1/2^N)*360$ degrees, where N is a positive integer, in each iteration of (a). Thus, the processor 207 may explore the phase values $$\theta_{D/A} = -180 + k*(1/2^N)*360 \text{ degrees},$$

k=0, 1, 2, ..., $2^N-1$. In one group of embodiments, N may equal any integer value in the range [3,9]. However, values outside this range are contemplated as well.

In an alternative set of embodiments, the phase $\theta_{A/D}$ of the A/D converter 205 may be varied instead of the phase $\theta_{D/A}$ of the D/A converter 240.

In some embodiments, the processor 207 may compute:
a Fast Fourier Transform (FFT) of the noise burst that is transmitted as output Y(k);
an FFT of the response signal X(k) captured from the microphone input channel; and
a ratio $H_{linear} = X(\omega)/Y(\omega)$, where $Y(\omega)$ denotes the transform of Y(k), and $X(\omega)$ denotes the transform of X(k). The ratio $H_{linear} = X(\omega)/Y(\omega)$ represents the linear part of a model M describing the relationship between signals at the circuit node corresponding to Y and the circuit node corresponding to X. See FIG. 8.

In order to compute the parameters of the nonlinear part of the model M, the processor 207 may transmit sine wave tones (at two different non-harmonically related frequencies) as output Y(k), and, capture the response signal X(k) from the microphone input channel. The processor may compute the spectrum $X(\omega)$ of the response signal X(k) by performing an FFT, and equalize the spectrum $X(\omega)$ by multiplying the spectrum $X(\omega)$ by the inverse of the transfer function $H_{linear}$ measured above:

$$Y^{eq}(\omega) = X(\omega)/H_{linear}(\omega).$$

The processor 207 may adapt the parameters of the nonlinear portion until the output of the model M closely matches the measured data.

In one set of embodiments, the model M may be a Volterra model.

During operation of the speakerphone 300, the processor 207 may transmit the output signal Y(k) through the output channel (including D/A converter 240, power amplifier 250 and speaker 225) and capture the input signal X(k) from the microphone input channel. Now the signal X(k) and Y(k) are carrying the substance of a live conversation between local participants and remote participants. The processor 207 may generate the correction signal E(k) by applying the non-linear portion of the model M to the signal Y(k) in the time domain, and applying the linear portion of the model M to the spectrum Y($\omega$) in the frequency domain.

The parameters of the model M (including the linear portion and the nonlinear portion) may be recomputed periodically (or intermittently) in order to track changes in the characteristics of the speaker and microphone. See the various embodiments described above for estimating the parameters of the model M.

The linear calibration may be performed during the night when speakerphone is less likely to be used and when people are less likely to be in the room or near the room and when the air conditioning (or any other noise sources that would reduce the accuracy of the measurement) is less likely to be operating. For example, the processor may be programmed to perform the calibration at 2:00 AM if a call is not in progress and if the room is sufficiently quiet as determined by the signal coming from the microphone(s).

A Series of Echo Cancellers Corresponding to Virtual Audio Source Positions

Figure 12:
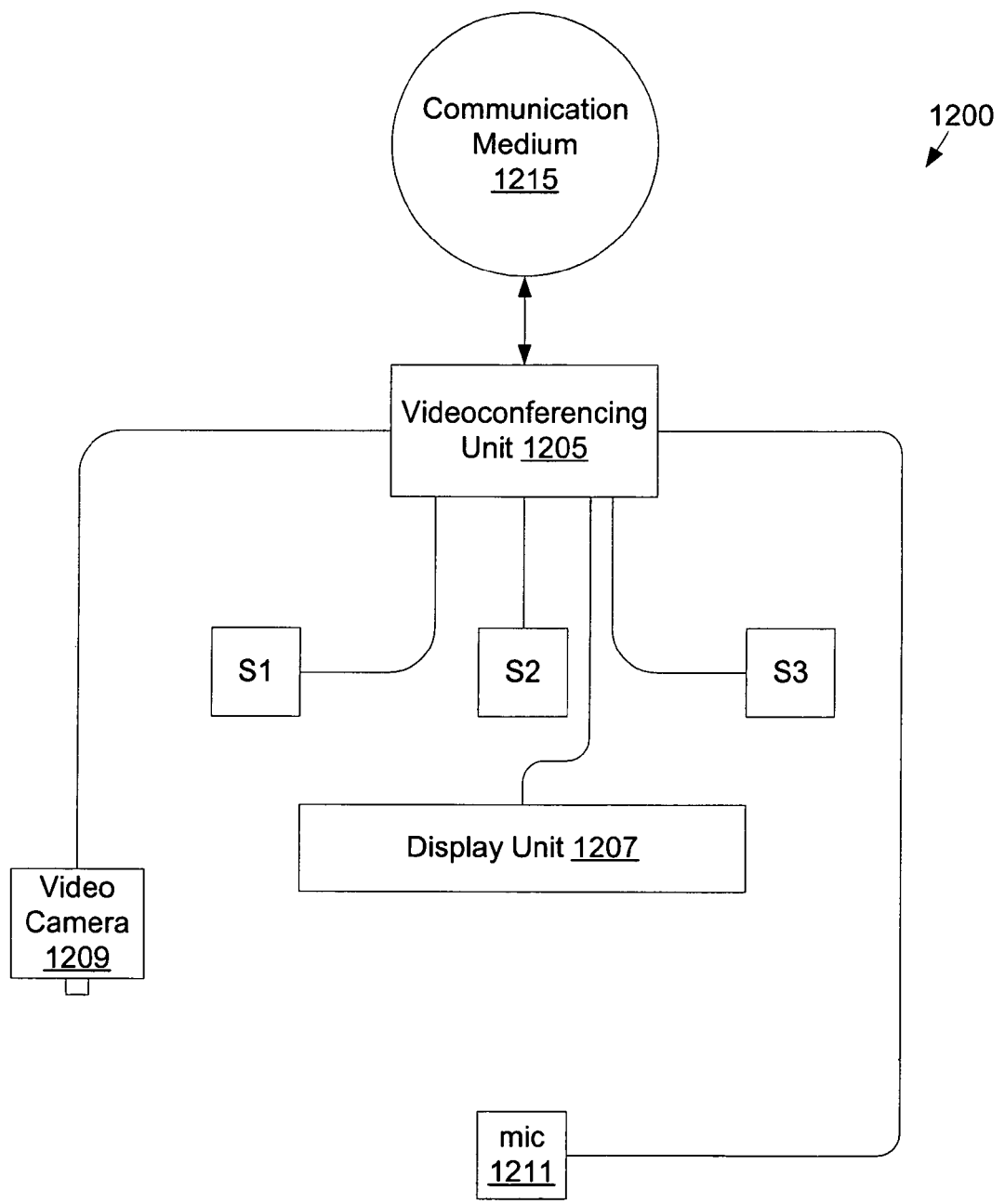
FIG. 12 illustrates one set of embodiments of a video conferencing system.

FIG. 12 illustrates one set of embodiments of a videoconferencing system 1200. The videoconferencing system 1200 may include a videoconferencing unit 1205, speakers S1, S2 and S3, a display unit 1207, a video camera 1209 and a microphone 1211. The videoconferencing unit 1205 may be configured for coupling to the speakers, the display unit, the video camera and the microphone, and to a communication medium 1215.

The videoconferencing unit 1205 may communicate with one or more remote systems through the communication medium 1215. The communication medium may be realized by any of a wide variety of communication technologies. For example, the communication medium may be the PSTN, a computer network (such as a local area network, a wide area network, or the Internet), an optical communication medium, etc.

The videoconferencing unit 1205 may receive an audio signal R and a video signal V from a remote system through the communication medium 1215. The audio signal R may be a signal captured by a microphone of the remote system. The video signal V may be a signal captured by a video camera of the remote system.

The audio signal R may be used to drive speakers S1, S2 and S3 so that local conference participants (i.e., participants in the environment of videoconferencing system 1200) can hear the voices of the remote conference participants (i.e., participants in the environment of the remote system). For example, the videoconferencing unit 1205 may drive the speakers S1, S2 and S3 according to the relations:

$$S1 = C_1 * R$$

$$S2 = C_2 * R$$

$$S3 = C_3 * R.$$

The videoconferencing unit 1205 may control the gain coefficients $C_1$, $C_2$ and $C_3$ in order to position the virtual source (i.e., the perceived source) of the audio signal R anywhere along the line (or curve) passing through the speakers. For example, if $C_1=\frac{1}{2}$, $C_2=\frac{1}{2}$ and $C_3=0$, the audio signal R will appear as if it is emanating from a position half way between speakers S1 and S2.

The video signal V may be provided to display unit 1207 so that local conference participants can see the remote conference participants.

In some embodiments, the remote system may send a spatial indicator $I_S$ regarding the current position of a remote talker (or, more generally, an audio source), e.g., within the field of view of the remote camera. The videoconferencing unit 1205 may use the spatial indicator to control the magnitudes of gain coefficients $C_1$, $C_2$ and $C_3$ for the speaker output channels. In particular, the videoconferencing unit 1205 may control the gain coefficients $C_1$, $C_2$ and $C_3$ so that the virtual source position of the remote audio signal R agrees with the instantaneous position specified by the spatial indicator. Thus, the local participants may perceive an agreement between the virtual source position of the audio signal R and the position of the remote talker on the screen of display unit 1207.

Furthermore, the videoconferencing unit 1205 may communicate with a number of remote systems, each of which provides at least an audio signal and corresponding spatial indicator. If a remote system is equipped with a video camera, the remote signal may send a video signal as well. The videoconferencing unit 1205 may drive the speakers S1, S2 and S3 according the relations:

$$S1 = \sum_{j=1}^{N_R} C_1(j) * R(j)$$

$$S2 = \sum_{j=1}^{N_R} C_2(j) * R(j)$$

$$S3 = \sum_{j=1}^{N_R} C_3(j) * R(j).$$

where R(j) is the remote audio signal from the $j^{th}$ remote system, where $N_R$ is the number of remote systems, where $C_1(j)$, $C_2(j)$ and $C_3(j)$ are gain coefficients for the remote signal R(j). The videoconferencing unit 1205 determines the gain coefficients $C_1(j)$, $C_2(j)$ and $C_3(j)$ based on the spatial indicator $I_s(j)$. Thus, the videoconferencing unit places each remote audio signal R(j) at a corresponding virtual source position determined by the corresponding spatial indicator $I_S(1)$. For example, suppose that there are two remote systems ($N_R$=2), that spatial indicator $I_S(1)$ specifies a virtual source position half way between speakers S1 and S3, and that spatial indicator $I_S(2)$ specifies a virtual source position half way between speakers S2 and S3. In this case, the videoconferencing unit may set the gain coefficients as follows: $C_1(1)=\frac{1}{2}$, $C_2(1)=\frac{1}{2}$, $C_3(1)=0$ and $C_1(2)=0$, $C_2(2)=\frac{1}{2}$, $C_3(2)=\frac{1}{2}$. Thus, while a first remote talker at the first remote system and a second remote talker at the second remote system may be talking simultaneously, the spatial separation in their virtual source positions allows local participants to more readily distinguish the two remote audio signals.

The remote systems may send updated spatial indicators, e.g., as talkers move, as persons start talking, or a persons go silent.

Figure 13:
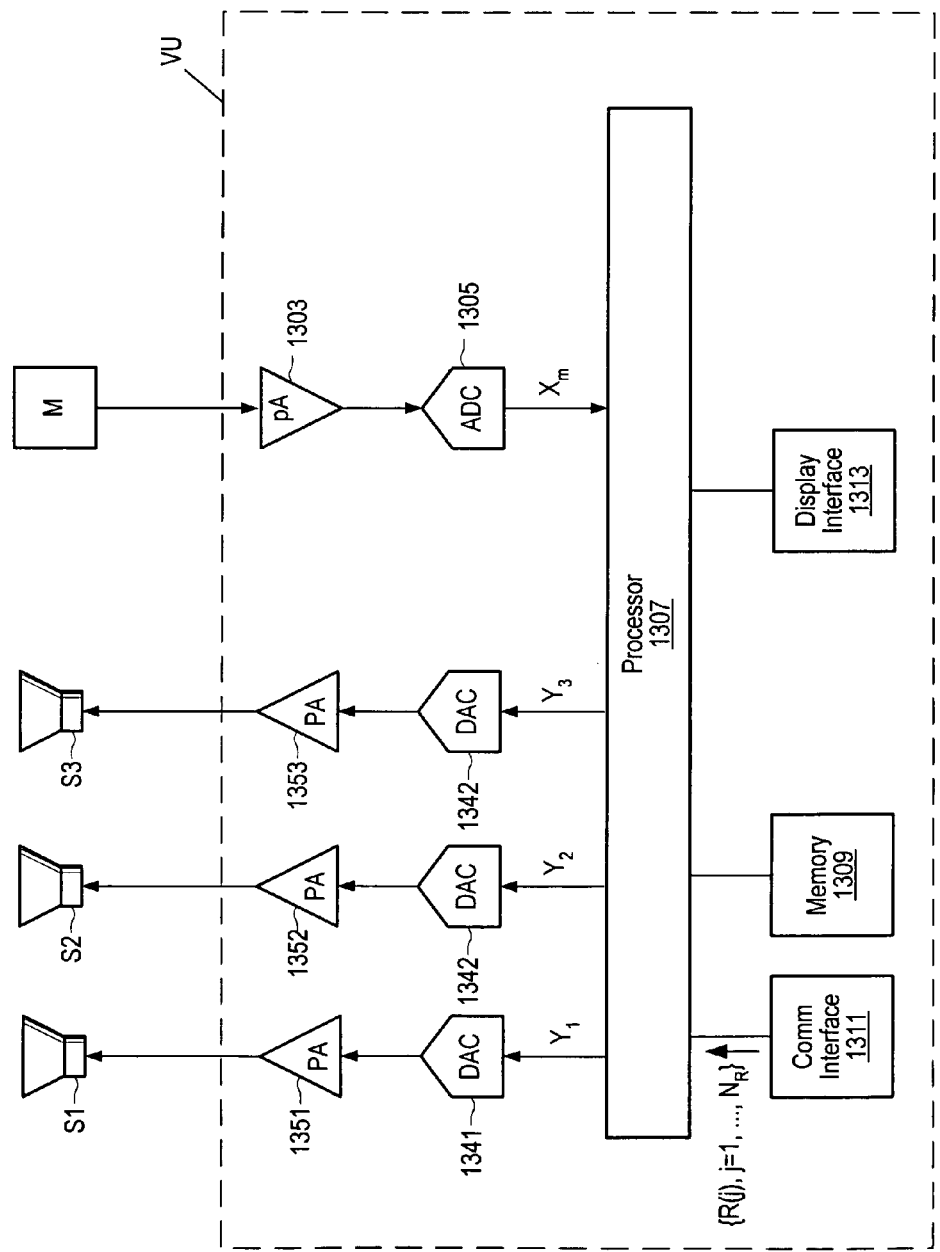
FIG. 13 illustrates one set of embodiments of a videoconferencing unit having three speaker output channels and one microphone input channel.

In some embodiments, the videoconferencing unit 1205 may be configured as illustrated in FIG. 13. The videoconferencing unit 1205 may include a processor 1307 (or a set of processors) and memory 1309. The processor 1307 may be configured to read program instructions which have been stored in memory 1309 and to execute the program instructions in order to enact any of the various method embodiments described herein (or combinations thereof, or portions thereof).

Memory 1309 may include any of various kinds of semiconductor memory or combinations thereof. For example, in one embodiment, memory 209 may include a combination of Flash ROM and DDR SDRAM.

The videoconferencing unit may also include digital-to-analog converters 1341, 1342 and 1343, and power amplifiers 1351, 1352 and 1353, in order to drive the speakers S1, S2 and S3 respectively. Furthermore, the videoconferencing unit 1205 may include a preamplifier 1303 and an analog-to-digital converter 1305 in order to capture the microphone input signal. The amplified and digitized version of the microphone input signal is denoted $X_m$.

The videoconferencing unit 1205 may also include: a communication interface 1311 for interfacing with communication medium 1215, and a display interface 1313 for driving display unit 1207.

The processor 1307 may receive the digital input signal $X_m$ from the ADC 1305 and the remote audio signals $R(j)$, $j=1, 2, \ldots, N_R$ from the communication interface 1311.

The processor 1307 may execute $N_E$ echo cancellers, where $N_E$ is an integer greater than or equal to two. Each of the $N_E$ echo cancellers corresponds to one virtual position in a set of $N_E$ virtual positions along the line segment (or curve) connecting the speakers S1, S2 and S3. Let $S_{VP}$ denote the set of $N_E$ virtual positions.

Figure 14:
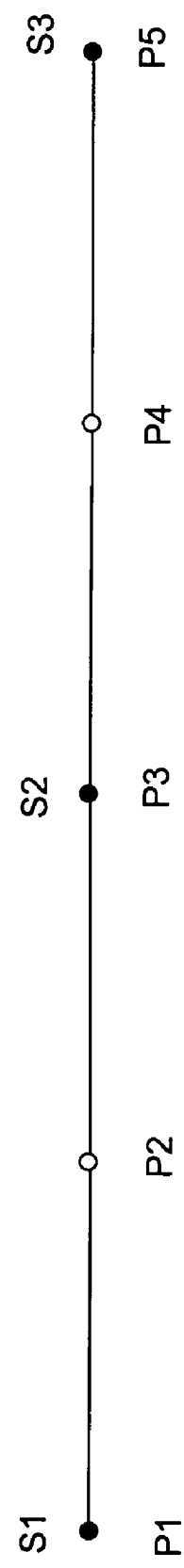
FIG. 14 illustrates an embodiment for a set of virtual source positions along a one-dimensional locus of points passing through the speakers.

FIG. 14 illustrates the case $N_E=5$. Five virtual positions P1 through P5 span the imaginary line segment connecting the speakers S1, S2 and S3. Three of the 5 virtual positions (i.e., virtual positions P1, P3 and P5) correspond to the physical positions of speakers S1, S2 and S3. Let EC(k) denote the echo canceller corresponding to virtual position $P_k$, $k=1, 2, 3, 4, 5$.

Figure 15:
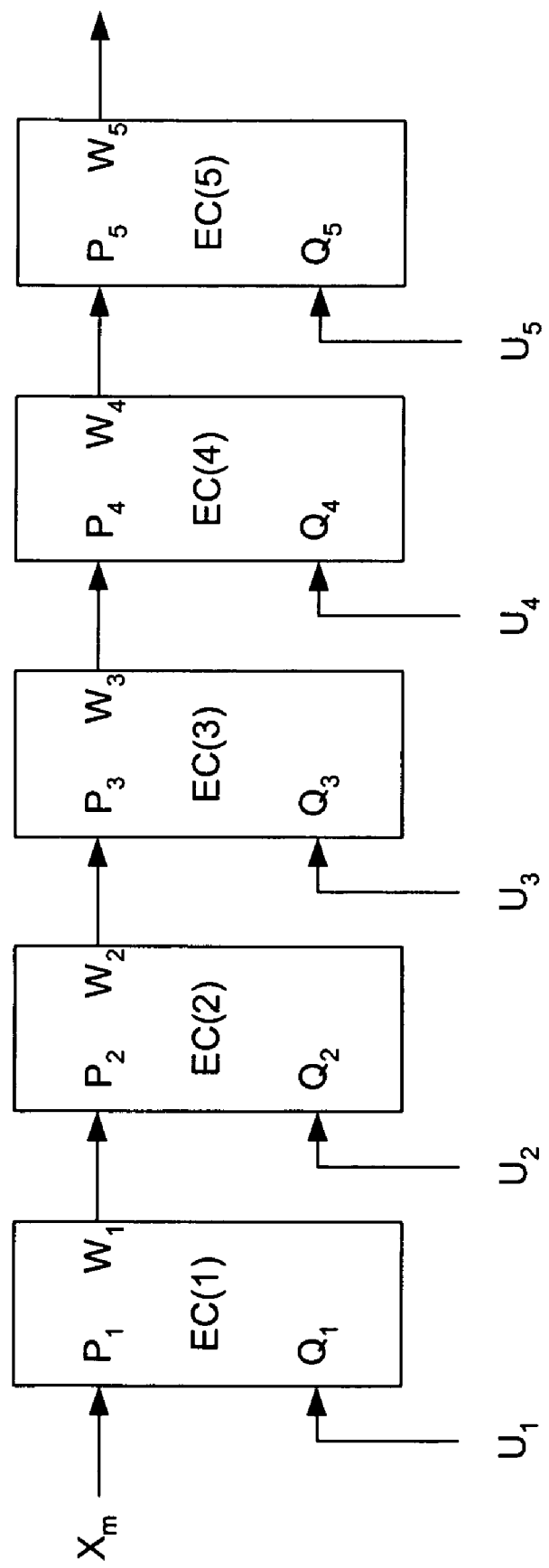
FIG. 15 illustrates one set of embodiments of a series of echo cancellers.

The echo cancellers EC(k), k=1, 2, 3, 4, 5, may be coupled together in a series, e.g., as shown in FIG. 15. Each echo canceller EC(k) has a signal input $P_k$, a signal input $Q_k$ and a signal output $W_k$. Echo canceller EC(k) attempts to remove scaled and delayed copies of signal input $Q_k$ from signal input $P_k$, resulting in output signal $W_k$. The output signal W generated by echo canceller EC(k) is supplied as the P input of the next echo canceller EC(k+1).

The microphone input signal $X_m$ may be provided to the P input of the first echo canceller EC(1). The Q input of the first echo canceller may be provided with a signal $U_1$ comprising a sum of any of the remote audio signals $R(j)$ that map to the virtual position P1 as determined by the corresponding spatial indicators $I_S(j)$. In general, the Q input of echo canceller EC(k), k=1, 2, 3, 4, 5, may be provided with a signal $U_k$ comprising a sum of any remote audio signals $R(j)$ that map to virtual position Pk as determined by the corresponding spatial indicators $I_S(j)$. During periods of time when none of the remote audio signals $R(j)$ map to virtual position Pk, signal $U_k$ may be set to zero, i.e., the Q input of echo canceller EC(k) may be fed with zeroes. Thus, each echo canceller EC(k) may converge to a state where it is effective at performing echo cancellation for remote audio signals that map to virtual position Pk.

In response to receiving a set of samples of the remote audio signal $R(j)$ and the corresponding spatial indicator $I_S(j)$, the processor may operate on the spatial indicator $I_S(j)$ to determine a virtual source position $H(j)$ for remote audio signal $R(j)$, and then map the virtual source position $H(j)$ to a nearest one of the virtual positions of the set $S_{VP}$. Let $k(j)$ denote the index value k of the virtual position $P_k$ nearest to virtual source position $H(j)$. The input signals $U_k$, k=1, 2, 3, 4, 5, for the echo cancellers may be generated according to the following pseudo code:

For k=1 to 5
$U_k=0$
Endfor
For j=1 to $N_R$
$U_{k(j)}=U_{k(j)}+R(j)$
Endfor.

The output $W_5$ of the last echo canceller may be a quality representation of the audio signal(s) generated by local participant(s). Thus, the output signal $W_5$ may be sent to each of the remote systems so that remote participants at the remote systems can hear the local participants. Alternatively, the videoconferencing system may generate a resultant signal $T(j)$ to be transmitted to the $j^{th}$ remote system, j=1, 2, \ldots, $N_R$, according to the relation:

$$T(j) = W_5(j) + \sum_{\substack{i=1 \\ i \neq j}}^{N_R} R(i).$$

While FIGS. 12-15 illustrate a videoconferencing system supporting 3 speakers and 5 echo cancellers (and 5 corresponding virtual positions in the set $S_{VP}$), one skilled in the art will understand that the principles described herein are generally applicable to arbitrary numbers of speakers and arbitrary numbers of echo cancellers (and corresponding virtual positions).

In some embodiments, a remote system may be capable of supplying a plurality of remote audio signals, each with corresponding spatial indicator. For example, the remote system may employ a plurality of beams formed from a microphone array of the remote system. The plurality of beams may be pointed at a plurality of remote talkers. Thus, the remote audio signals to be sent to the videoconferencing system 1200 may be the signals provided by the plurality of beams, and the spatial indicator corresponding to each remote audio signal may be an indication (e.g., an encoded version) of the angle of the corresponding beam.

In some embodiments, the videoconferencing unit 1205 is configured for coupling to a speakerphone, e.g., a speakerphone as described above in conjunction with FIG. 1B or FIG. 8. The microphone 1211 may be a microphone of the speakerphone. The speakerphone may include an array of microphones, e.g., as suggested in FIG. 7.

Figure 16:
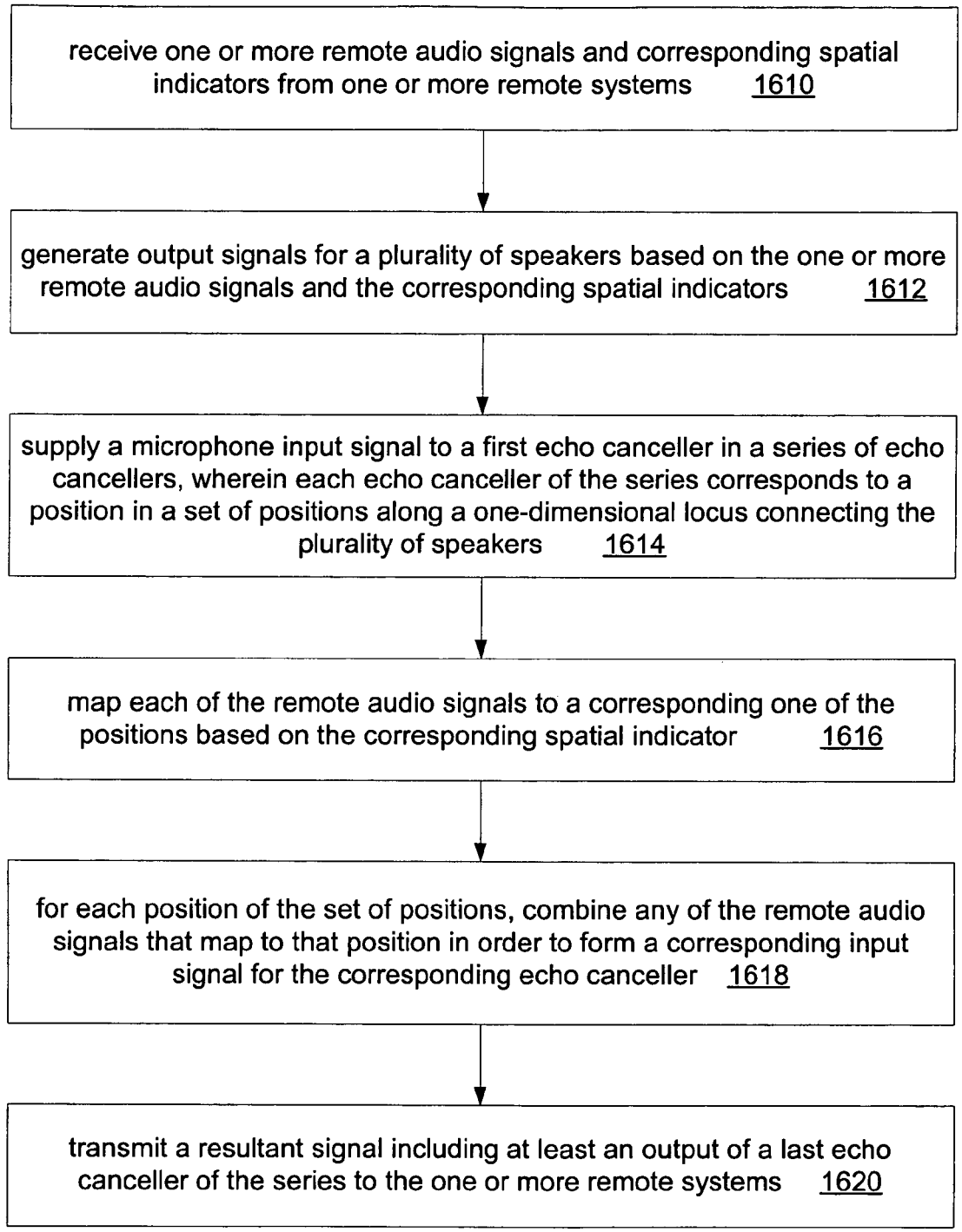
FIG. 16 illustrates one set of embodiments of a method for performing echo cancellation.

FIG. 16 illustrates one set of embodiments of a method for performing echo cancellation.

At 1610, one or more remote audio signals and corresponding spatial indicators may be received from one or more remote systems.

At 1612, output signals for a plurality of speakers may be generated based on the one or more remote audio signals and the corresponding spatial indicators.

At 1614, a microphone input signal may be supplied to a first echo canceller in a series of echo cancellers, wherein each echo canceller of the series corresponds to a position in a set of positions along a one-dimensional locus connecting (or passing through) the plurality of speakers.

At 1616, each of the remote audio signals may be mapped to a corresponding one of the positions based on the corresponding spatial indicator.

At 1618, for each position of the set of positions, any of the remote audio signals that map to that position may be combined in order to form a corresponding input signal for the corresponding echo canceller.

At 1620, a resultant signal including at least an output of a last echo canceller of the series may be transmitted to the one or more remote systems.

The action 1612, i.e., the action of generating output signals for a plurality of speakers, may include determining a set of gain coefficients for each remote audio signal based on the corresponding spatial indicator, where each gain coefficient of the set of gain coefficients controls an extent to which the remote audio signal contributes to a corresponding one of the speaker output signals.

The actions 1610 through 1620 may be performed by one or more processors in a device such as a videoconferencing system or a speakerphone.

The method may also include: receiving one or more remote video signals from the one or more remote systems; generating a local video signal from the one or more remote video signals; and displaying the local video signal on a display unit. The display unit be realized by any of various display technologies, e.g., a television, a projector, a head-mounted display, a computer monitor, etc.

The action of combining any of the remote audio signals that map to a position in order to form a corresponding input signal may involve setting the corresponding input signal equal to zero in the case that there are currently no remote audio signals that map to that position.

The method may also include repeating 1610 through 1620, e.g., on an ongoing basis throughout the course of a conversation.

Furthermore, various embodiments of a system including a memory and a processor (or a set of processors) are contemplated, where the memory is configured to store program instructions and the processor is (or, the set of processors are) configured to read and execute the program instructions from the memory. In various embodiments, the program instructions encode corresponding ones of the method embodiments described herein (or combinations thereof or portions thereof). For example, in one embodiment, the program instructions are executable to implement:
  (a) receiving one or more remote audio signals and corresponding spatial indicators from one or more remote systems;
  (b) generating output signals for a plurality of speakers based on the one or more remote audio signals and the corresponding spatial indicators;
  (c) supplying a microphone input signal to a first echo canceller in a series of echo cancellers, wherein each echo canceller of the series corresponds to a position in a set of positions along a one-dimensional locus connecting the plurality of speakers;
  (d) mapping each of the remote audio signals to a corresponding one of the positions based on the corresponding spatial indicator;
  (e) for each position of the set of positions, combining any of the remote audio signals that map to that position in order to form a corresponding input signal for the corresponding echo canceller;
  (f) transmitting a resultant signal including at least an output of a last echo canceller of the series to the one or more remote systems.

The system may also include the microphone and the plurality of speakers. For example, embodiments of the system targeted for realization as a speakerphone may include the microphone and the speakers. In some embodiments, the system may be a speakerphone as described above in conjunction with FIG. 1B or FIG. 8, with the qualification that the single speaker output channel shown in those figures is to be replaced by a plurality of speaker output channels. Thus, the program instructions may be stored in memory 209 and the processor 207 may perform actions (a) through (f).

In some embodiments, the system may also include a display unit and a video camera. For examples, embodiments of the system that are targeted for realization as a videoconferencing system may include the display unit and the video camera.

In some embodiments, the system may be the videoconferencing unit of FIG. 13, or, a similar videoconferencing unit supporting a different number of speakers.

In one embodiment, (a) through (f) may be performed for each microphone in an array of microphones. A separate series of echo cancellers may be maintained for each microphone. In some embodiments, beam forming may be performed on the corrected microphone signals, i.e., the output signal from the last echo canceller of each series.

Audio Output in Video Conferencing and Speakerphone Based on Call Type

Figure 17:
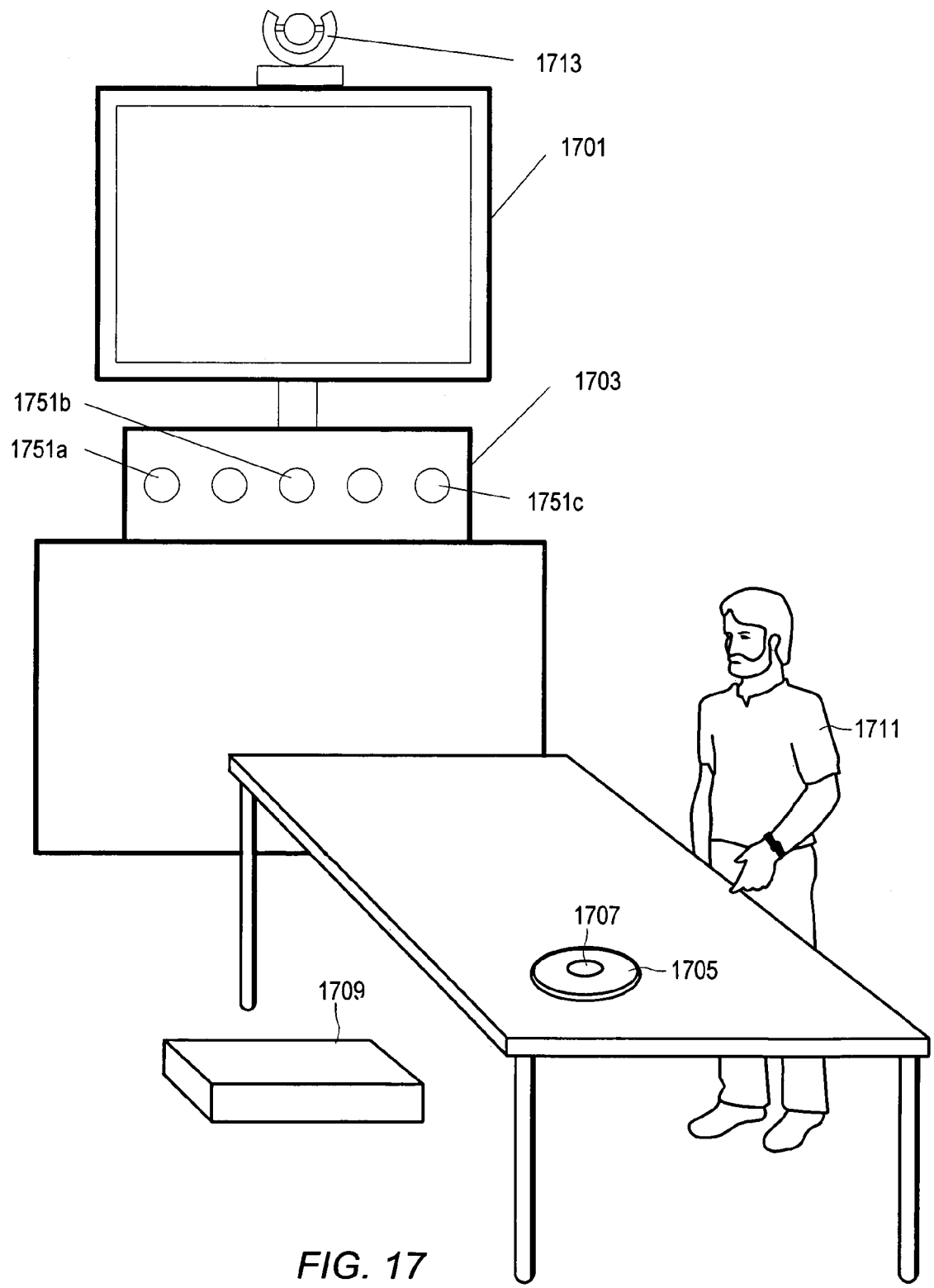
FIG. 17 illustrates an integrated video conferencing and speakerphone unit.

Referring to FIG. 17, in some embodiments, a conference call may involve participants with video conferencing systems and audio participants with speakerphone systems. In some embodiments, sound from speakerphone participants may be sent through a speakerphone sound system 1707 while sound from video participants may be sent through the video sound system 1703 (e.g., near a video monitor 1701). In some embodiments, sound may be localized to only the video sound system 1703 or only the speakerphone sound system 1707. In some embodiments, sound may be localized through a combination of both the video sound system 1703 and the speakerphone sound system 1707 to produce a spatially correct sound field (i.e., video participants heard through the video sound system and speakerphone participants heard through the speakerphone) for in room participants 1711. In some embodiments, the spatially correct sound field may provide a more natural sound experience for the person 1711 in the room. The sound systems may have a selectable audio input with an adjustable output attenuation (i.e., volume control), and some form of sound reproduction (e.g., speaker(s)).

In some embodiments, the components of the video conferencing system and the speakerphone may be coupled wirelessly through the system codec 1709. In some embodiments, other connection mediums (e.g., Ethernet cables) may be used. The system codec 1709 may coordinate the sound production for the video conferencing system and speakerphone.

In some embodiments, the speakerphone may be coupled to the system through a power over Ethernet (POE) cable. The speakerphone may have 16 microphones to provide high quality audio pickup using directional pickup beams from the 16 microphones. Other numbers of microphones may be used. In some embodiments, a speakerphone coupled to the system may provide audio pick-up (i.e., detection) for video and/or audio calls.

In some embodiments, video conferencing systems with an integrated speakerphone may have two distinct sound systems for reproducing the audio of a call, the one attached to and associated with the system's codec functionality (i.e., video sound system 1703), and the speakerphone itself 1705. Video calls may use both video and audio streams during the call, while audio calls may use only audio streams. In some embodiments, the video sound system 1703 may emanate from or appear to emanate from the connected monitor 1701 (e.g., television). In some embodiments, the speakerphone sound system 1707 may emanate from the speakerphone 1705. Distinct locations of the two sound systems may create a directional sound field allowing the persons 1711 within the room to discern from which direction, hence which sound subsystem, the sound emanates.

In various embodiments, both the speakerphone 1705 and the video codec may provide separate means of sound attenuation. The speakerphone 1705 may have a volume up/down button on the device, while the video codec may use a remote control with volume up/down buttons. During homogeneous type (audio or video), single or multi-connection calls, pressing either set of volume control buttons may adjust the attenuation of the sound of the call. In some embodiments, the system may not correlate button sets with a type of call. For example, during an audio only call, pressing the volume up/down buttons on the remote control may adjust the attenuation of the speakerphone sound subsystem 1707. Likewise, during a video call, pressing the volume up/down buttons on the speakerphone may adjust the attenuation of the video call.
Integrated Portable High Definition (HD) Video and Audio Conferencing System with Spatial Audio In some embodiments, the video conference system may have an integrated speakerphone system to manage both a speakerphone and a video conferencing system. For example, a speakerphone and a video conferencing system may be coupled to the integrated video and audio conferencing system 1709 and may receive audio and/or video signals from the integrated unit 1709.

Figure 18:
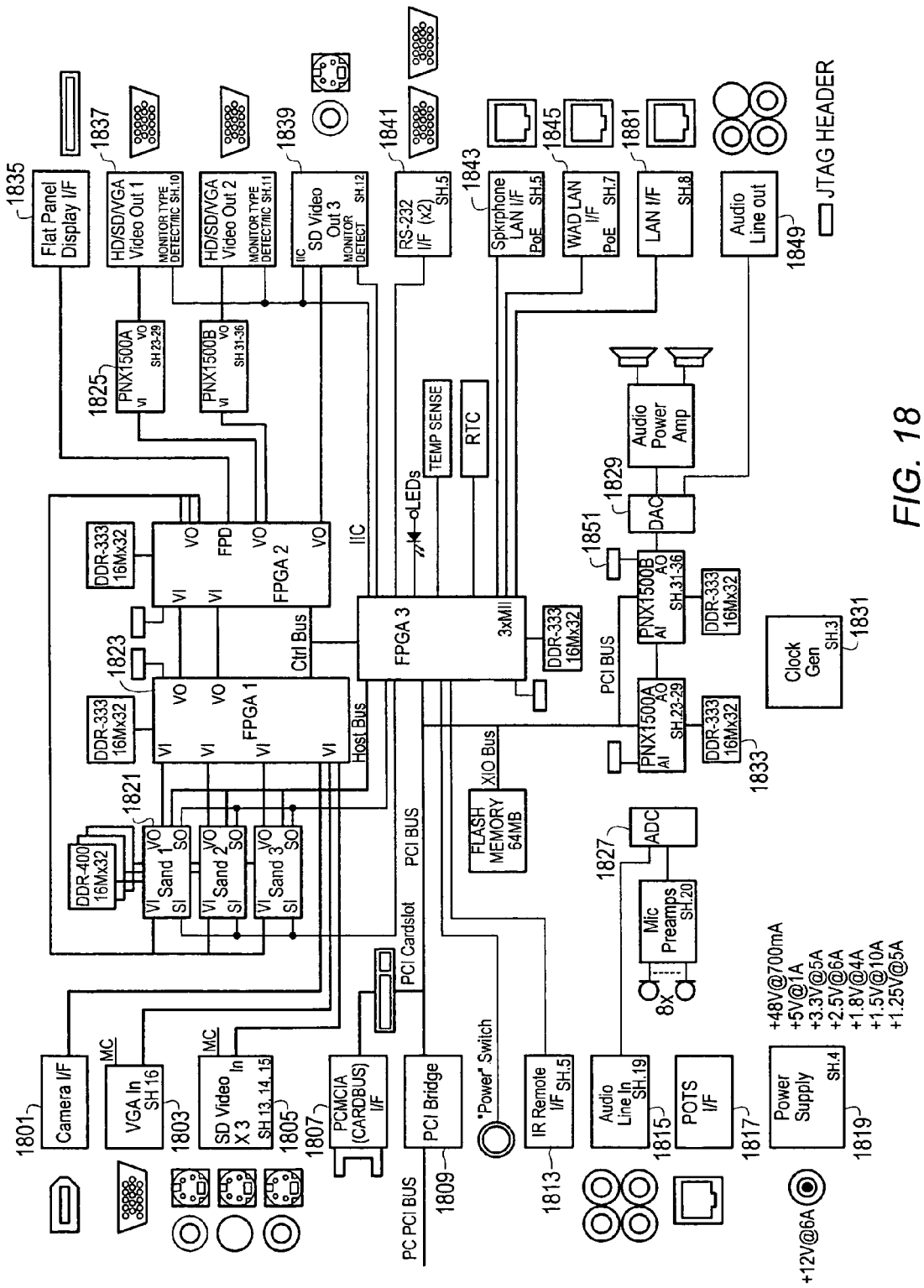
FIG. 18 illustrates a circuit diagram of a video conferencing and speakerphone unit, according to an embodiment.

FIG. 18 illustrates a circuit diagram of a video conferencing and speakerphone unit, according to an embodiment. In some embodiments, inputs to the circuit may include a camera interface 1801, a video graphics adapter (VGA) input 1803, a standard video (SD) input (e.g., 3 separate SD inputs) 1805, a Personal Computer Memory Card International Association (PCMCIA) Card interface 1807, a Peripheral Component Interconnect (PCI) bridge 1809, a power switch 1811, an infrared (IR) remote interface 1813, an audio line in 1815, a Plain Old Telephone Service (POTS) interface 1817, and a power supply 1819. As shown, the signals from these interfaces and inputs may be modified using Sands 1821, Field Programmable Gate Array (FPGA) 1823, and other processors (e.g., Phillips Nexperia 1500™ (PNX 1500) 1825). In addition, analog to digital 1827 and digital to analog converters 1829, clocks 1831 (e.g., real time clock and clock generator), and memory 1864 (e.g., double data rate (DDR), flash memory, etc) may also be used. In some embodiments, outputs may include a flat panel display interface 1866, an HD/SD/VGA video out 1868 (e.g., multiple video outs), an SD video out 1870, an RS-232 port 1872, a speakerphone local area network (LAN) interface 1874, a Wireless Access Device (WAD) LAN interface 1876, a LAN interface 1881, and an audio line out 1849. Other inputs and outputs are also contemplated. Joint Test Action Group (JTAG) 1851 may also be used.

In some embodiments, an integrated fixed focus high definition lens and image sensor may be used (e.g. to deliver 1280×720 resolution at 30 frames per second (fps)). The system may also use two high quality long travel 1-inch diameter ported speakers with a frequency response of approximately 150 Hz to 22 kHz. Other speakers may also be used. In some embodiments, low noise microphones may be used at positions supporting either broad-fire or end-fire microphone array processing. In some embodiments, approximately 8 low noise microphones may be used (other numbers of microphones are also contemplated). The microphones may detect audio from a user (who may typically be approximately 3' to 5' from the system). Audio algorithms may direct the microphone array at the user speaking and minimize background noise and reverberation. Additional beam forming algorithms may be used to determine the horizontal angle of the user with respect to the system.

In some embodiments, the optimum viewing distance by someone with normal vision may be where the resolving power of the eye is just equal to the pixel pitch of the image. At that distance the image may appear as sharp as a live image. At closer distances, the image may appear blurry and at farther distances, some of the resolution may be wasted. Someone with normal eyesight may resolve about $1/60$ of degree of arc. In some embodiments, the optimal viewing distance in inches may be calculated as approximately 3438/(pixel pitch) where the pixel pitch is the number of pixels on the monitor per inch. Other formulas for the optimal viewing distance are also contemplated. In some embodiments, a screen diagonal of approximately 17 inches with an aspect ratio of approximately 16:9 may be used. A video resolution of 1280×720 for a screen of 14.8×8.3 (width vs. height) may result in the optimum viewing distance of approximately 40 inches (3.3 feet). In some embodiments, for room systems, a screen diagonal approximately in the range of 50" to 60" may be used with an aspect ratio of 16:9. Other diagonals and aspect ratios may also be used. In some embodiments, the video resolution for the 50" screen may be approximately 1280×720, with a screen width vs. height of 43.6×24.5 and an optimal viewing distance of 117 inches (9.7 feet). The optimal viewing distance of 9.7 feet may roughly match a typical viewing distance in a conference room.

In some embodiments, spatially realistic audio may be provided for a video call. In some embodiments, voices coming from the people on the left side of the screen, in a video call, may be directed through audio on the left side of the screen (e.g., at least speaker 1751a) at the unit on the other end (similarly for voices from the center (speaker 1751b) and right side (speaker 1751c) of the screen). This may result in giving the user a realistic audio experience that may match the realism of the video experience. In some embodiments, audio from a speakerphone (for example, from a speakerphone only audio participant) may come through only the speakerphone. In some embodiments, the audio from the audio only participants may be provided through other speakers on the system.

Figure 19:
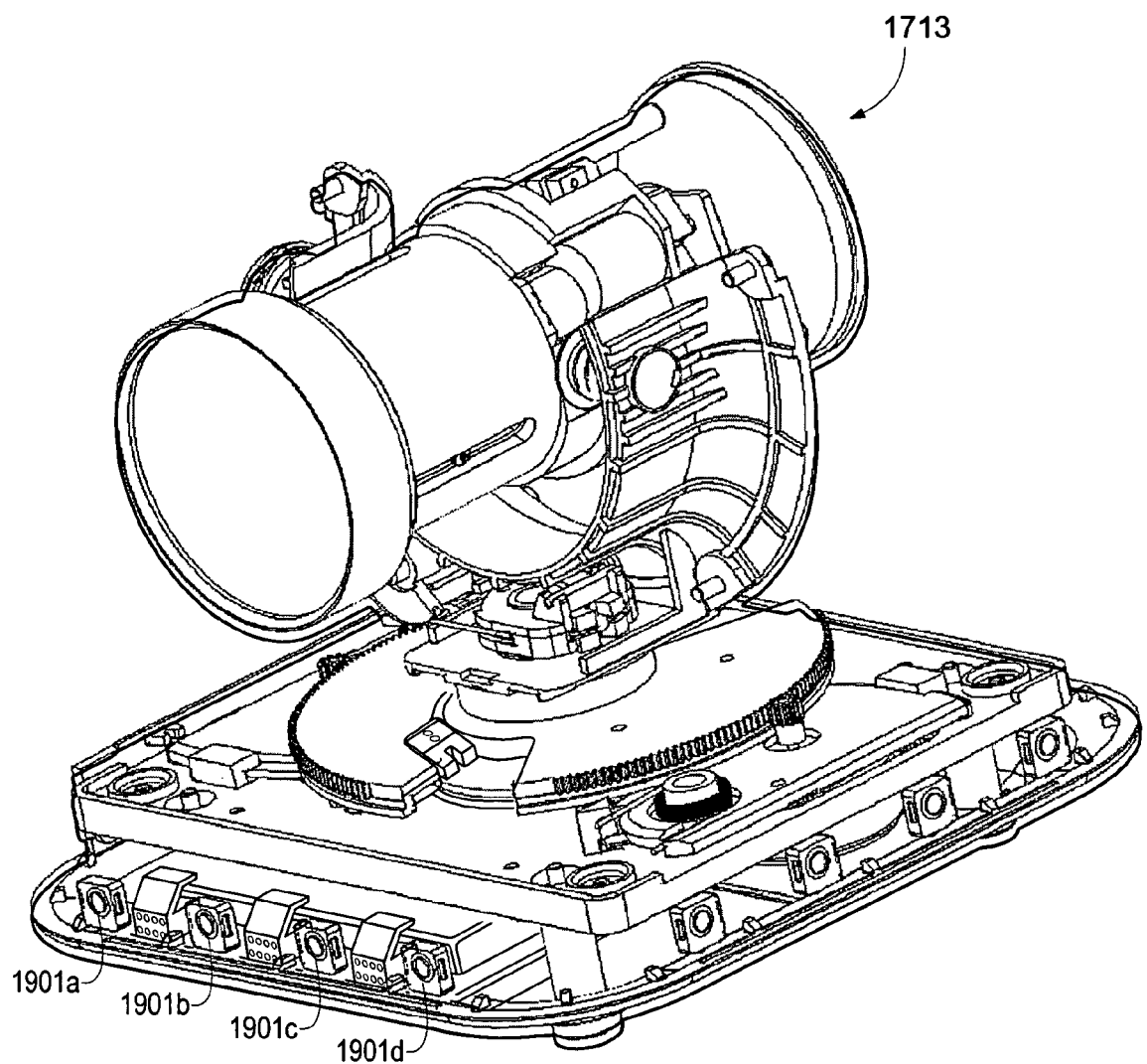
FIG. 19 illustrates an internal view of a camera, according to an embodiment.

In some embodiments, two speakers may be used in the system to create synthesized stereo sound at a location specified by position information received as side information along with the existing single audio channel. As seen in FIG. 19, the location may be determined by using beam forming with integrated microphones 1901 on the camera 1713 (an internal view of the camera 1713 is shown in FIG. 19). For example, information sent with the audio signal may indicate the audio came principally from the left side of the system. Other numbers and locations of the integrated microphones 1901 may also be used. The audio signal may then be sounded over speakers primarily on the left side of the displaying system. In some embodiments, the sound may be produced from speakers on the system that are directed towards the left side of the system (i.e., pointed to the left). Other speaker configurations are also contemplated.

In some embodiments, a true stereo echo canceller may not be required. For example, an independent echo canceller may be used for each virtual talker position. In some embodiments, five synthesized talker locations may be used across the display (other numbers of synthesized talker locations may also be used). Each may be on or off resulting in 32 collective virtual talker positions and 32 independent echo cancellers. Other numbers of collective virtual talker positions and independent echo cancellers may be used. When a set of talker positions is active, a corresponding echo canceller may be activated. In some embodiments, the computational load of the system may not become excessively large because only one echo canceller may be executing at any one time.

In some embodiments, a true stereo echo canceller may be used. For example, a 3-channel or higher channel echo canceller may be used (a lower channel echo canceller may also be used). A beam former may be applied to the integrated microphones 1901 to generate a left and a right beam (or left, center, and right for a 3-channel echo canceller). The beams may become inputs to the left and right channels of the echo canceller. In some embodiments, beams determined by the integrated microphones 1901 in the camera 1713 may be continuously correlated with the beams locating the talker around the speakerphone. Depending on the visual field of the camera 1713, the correct speakerphone beams may be used to produce left and right audio channels. In some embodiments, the speakerphone beam former may generate a left and right beam (or left, center, and right beam for a 3 channel echo canceller). In some embodiments, these beams may become inputs to the left and right channels for the echo canceller. In some embodiments, audio beams used for the left and right channel coming from the speakerphone may provide better audio separation due to the high quality beams. In addition, they may eliminate the need to have two separate microphones for left and right channels placed in specific locations on the table.

In some embodiments, audio beams may be used for left and right channels to provide better audio separation and eliminate the need to have two separate microphones placed on the table in front of the unit (as opposed to just left and right microphones). In some embodiments, left and right microphones may also be used.

Any or all of the method embodiments described herein may be implemented in terms of program instructions (executable by one or more processors) and stored on a memory medium. A memory medium may include any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network. In some embodiments, a carrier medium may be used. A carrier medium may include a memory medium as described above, as well as signals such as electrical, electromagnetic, or digital signals, conveyed via a communication medium such as a bus, network and/or a wireless link.

The memory medium may comprise an electrically erasable programmable read-only memory (EEPROM), various types of flash memory, etc. which store software programs (e.g., firmware) that are executable to perform the methods described herein. In some embodiments, field programmable gate arrays may be used. Various embodiments further include receiving or storing instructions and/or data implemented in accordance with the foregoing description upon a carrier medium.

CONCLUSION

Various embodiments may further include receiving, sending or storing program instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method for performing echo cancellation of audio signals comprising:
   (a) receiving one or more remote audio signals and corresponding spatial indicators from one or more remote systems;
   (b) generating output signals for a plurality of speakers based on the one or more remote audio signals and the corresponding spatial indicators;
   (c) supplying a microphone input signal to a first echo canceller in a series of echo cancellers, wherein each echo canceller of the series corresponds to a position in a set of positions along a one-dimensional locus passing through the plurality of speakers~wherein each echo canceller of the series includes a first input, a second input and an output, wherein the output of each echo canceller except for a last echo canceller of the series feeds the first input of a next echo canceller of the series, wherein the microphone input signal is supplied to the first input of the first echo canceller;
   (d) mapping each of the remote audio signals to a corresponding one of the positions based on the corresponding spatial indicator;
   (e) for each position of the set of positions, combining any of the remote audio signals that map to that position in order to form a corresponding input signal which is supplied as the second input of the corresponding echo canceller;
   (f) transmitting a resultant signal including at least the output of the last echo canceller to the one or more remote systems.

2. The method of claim 1, wherein said generating output signals for a plurality of speakers comprises determining a set of gain coefficients for each remote audio signal based on the corresponding spatial indicator, wherein each gain coefficient of the set of gain coefficients controls an extent to which the remote audio signal contributes to a corresponding one of the speaker output signals.

3. The method of claim 1, wherein (a) through (f) are performed by one or more processors in a videoconferencing system.

4. The method of claim 1 further comprising:
- receiving one or more remote video signals from the one or more remote systems;
- generating a local video signal from the one or more remote video signals; and
- displaying the local video signal on a display unit.

5. The method of claim 1, wherein (a) through (f) are performed by one or more processors in a speakerphone.

6. The method of claim 1, wherein said combining any of the remote audio signals that map to that position in order to form a corresponding input signal comprises setting the corresponding input signal equal to zero if there are currently no remote audio signals that map to that position.

7. The method of claim 1 further comprising:
- repeating (a) through (f) a number of times.

8. A computer-readable memory medium configured to store program instructions, wherein the program instructions are executable to implement:
- (a) receiving one or more remote audio signals and corresponding spatial indicators from one or more remote systems;
- (b) generating output signals for a plurality of speakers based on the one or more remote audio signals and the corresponding spatial indicators;
- (c) supplying a microphone input signal to a first echo canceller in a series of echo cancellers, wherein each echo canceller of the series corresponds to a position in a set of positions along a one-dimensional locus passing through the plurality of speakers, wherein each echo canceller of the series includes a first input, a second input and an output, wherein the output of each echo canceller except for a last echo canceller of the series feeds the first input of a next echo canceller of the series, wherein the microphone input signal is supplied to the first input of the first echo canceller;
- (d) mapping each of the remote audio signals to a corresponding one of the positions based on the corresponding spatial indicator;
- (e) for each position of the set of positions, combining any of the remote audio signals that map to that position in order to form a corresponding input signal which is supplied as the second input of the corresponding echo canceller;
- (f) transmitting a resultant signal including at least the output of the last echo canceller to the one or more remote systems.

9. The memory medium of claim 8, wherein said generating output signals for a plurality of speakers comprises determining a set of gain coefficients for each remote audio signal based on the corresponding spatial indicator, wherein each gain coefficient of the set of gain coefficients controls an extent to which the remote audio signal contributes to a corresponding one of the speaker output signals.

10. The memory medium of claim 8, wherein the program instructions are executable to further implement:
- receiving one or more remote video signals from the one or more remote systems;
- generating a local video signal from the one or more remote video signals; and
- displaying the local video signal on a display unit.

11. The memory medium of claim 8, wherein said combining any of the remote audio signals that map to that position in order to form a corresponding input signal comprises setting the corresponding input signal equal to zero if there are currently no remote audio signals that map to that position.

12. The memory medium of claim 8 wherein the program instructions are executable to further implement:
- repeating (a) through (f) a number of times.

13. A system for performing echo cancellation of audio signals comprising:
- a memory configured to store program instructions;
- a processor configured to read and execute the program instructions from the memory, wherein the program instructions are executable by the processor to implement:
  - (a) receiving one or more remote audio signals and corresponding spatial indicators from one or more remote systems;
  - (b) generating output signals for a plurality of speakers based on the one or more remote audio signals and the corresponding spatial indicators;
  - (c) supplying a microphone input signal to a first echo canceller in a series of echo cancellers, wherein each echo canceller of the series corresponds to a position in a set of positions along a one-dimensional locus passing through the plurality of speakers, wherein each echo canceller of the series includes a first input, a second input and an output, wherein the output of each echo canceller except for a last echo canceller of the series couples to the first input of a next echo canceller of the series, wherein the microphone input signal is supplied to the first input of the first echo canceller;
  - (d) mapping each of the remote audio signals to a corresponding one of the positions based on the corresponding spatial indicator;
  - (e) for each position of the set of positions, combining any of the remote audio signals that map to that position in order to form a corresponding input signal which is supplied as the second input of the corresponding echo canceller;
  - (f) transmitting a resultant signal including at least the output of the last echo canceller to the one or more remote systems.

14. The system of claim 13, wherein said generating output signals for a plurality of speakers comprises determining a set of gain coefficients for each remote audio signal based on the corresponding spatial indicator, wherein each gain coefficient of the set of gain coefficients controls an extent to which the remote audio signal contributes to a corresponding one of the speaker output signals.

15. The system of claim 13 further comprising the microphone and the plurality of speakers.

16. The system of claim 15 further comprising a display unit and a video camera.

17. The system of claim 13, where the program instructions are executable to further implement:
- receiving one or more remote video signals from the one or more remote systems;
- generating a local video signal from the one or more remote video signals; and
- displaying the local video signal on a display unit.

18. The system of claim 13, wherein said combining any of the remote audio signals that map to that position in order to form a corresponding input signal comprises setting the corresponding input signal equal to zero if there are currently no remote audio signals that map to that position.

19. The system of claim 13, wherein the program instructions are executable to further implement:

repeating (a) through (f) for each microphone in an array of microphones.

20. The system of claim 13, wherein the program instructions are executable to further implement:

repeating (a) through (f) a number of times.

* * * * *